(12) United States Patent
Zheng et al.

(10) Patent No.: US 11,835,847 B2
(45) Date of Patent: Dec. 5, 2023

(54) SURVEILLANCE DEVICE

(71) Applicant: ZHEJIANG DAHUA TECHNOLOGY CO., LTD., Zhejiang (CN)

(72) Inventors: Liyun Zheng, Hangzhou (CN); Hui Zhan, Hangzhou (CN); Wenji Li, Hangzhou (CN); Dong Ye, Hangzhou (CN); Qilin Chen, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 147 days.

(21) Appl. No.: 17/444,576

(22) Filed: Aug. 6, 2021

(65) Prior Publication Data

US 2021/0364898 A1 Nov. 25, 2021

Related U.S. Application Data

(60) Division of application No. 16/831,930, filed on Mar. 27, 2020, now Pat. No. 11,092,883, which is a
(Continued)

(30) Foreign Application Priority Data

| Sep. 27, 2017 | (CN) | 201721254781.2 |
| Dec. 15, 2017 | (CN) | 201721755337.9 |
| Dec. 15, 2017 | (CN) | 201721756732.9 |

(51) Int. Cl.
*G03B 17/56* (2021.01)
*G03B 15/03* (2021.01)
(Continued)

(52) U.S. Cl.
CPC ............ *G03B 17/561* (2013.01); *G01V 1/00* (2013.01); *G03B 15/03* (2013.01); *H04N 23/51* (2023.01); *H04N 23/55* (2023.01); *H04N 23/90* (2023.01)

(58) Field of Classification Search
USPC .......................................... 396/427; 348/143
See application file for complete search history.

(56) References Cited

U.S. PATENT DOCUMENTS

| 5,067,855 A | 11/1991 | Kamitani |
| 5,107,286 A | 4/1992 | Sergeant et al. |

(Continued)

FOREIGN PATENT DOCUMENTS

| CA | 2238127 A1 | 11/1999 |
| CN | 2769955 Y | 4/2006 |

(Continued)

OTHER PUBLICATIONS

Communication Pursuant to Article 94(3) EPC in European Application No. 18862058.7 dated Jun. 27, 2022, 5 pages.
(Continued)

*Primary Examiner* — Clayton E. LaBalle
*Assistant Examiner* — Warren K Fenwick
(74) *Attorney, Agent, or Firm* — METIS IP LLC

(57) ABSTRACT

The present disclosure relates to a device. The device includes a first camera which is rotatable around a first axis and a second camera which is rotatable around a second axis. The first axis is in a direction of the second axis.

18 Claims, 28 Drawing Sheets

Related U.S. Application Data continuation of application No. PCT/CN2018/107355, filed on Sep. 25, 2018.

(51) Int. Cl.
  *G01V 1/00* (2006.01)
  *H04N 23/51* (2023.01)
  *H04N 23/55* (2023.01)
  *H04N 23/90* (2023.01)

(56) References Cited

U.S. PATENT DOCUMENTS

| | | | |
|---|---|---|---|
| 5,726,885 | A | 3/1998 | Klein et al. |
| 6,369,849 | B1 | 4/2002 | Rzyski |
| 7,016,518 | B2 | 3/2006 | Vernon |
| 7,762,731 | B2 | 7/2010 | Arbuckle et al. |
| 8,810,432 | B2 | 8/2014 | Townsend, Jr. |
| 8,837,928 | B1 | 9/2014 | Clearman et al. |
| 9,170,473 | B1 | 10/2015 | Li |
| 9,625,791 | B2 | 4/2017 | Harrison |
| 9,661,197 | B2 | 5/2017 | Clearman |
| 9,894,345 | B2 * | 2/2018 | Ezra .................. F16M 11/048 |
| 9,983,464 | B1 | 5/2018 | Kim et al. |
| 10,861,177 | B2 * | 12/2020 | Lu ...................... G06F 18/2411 |
| 2002/0060640 | A1 | 5/2002 | Davis et al. |
| 2005/0018897 | A1 * | 1/2005 | Choi .................. G01N 21/8806 382/141 |
| 2005/0267373 | A1 | 12/2005 | Lee |
| 2009/0028542 | A1 | 1/2009 | Nakamoto et al. |
| 2011/0085788 | A1 * | 4/2011 | Pace .................... G03B 35/08 396/428 |
| 2013/0176412 | A1 | 7/2013 | Chen |
| 2015/0316837 | A1 | 11/2015 | Maltese |
| 2016/0223886 | A1 | 8/2016 | Bellerive et al. |
| 2017/0009802 | A1 | 1/2017 | Uke et al. |
| 2017/0068149 | A1 * | 3/2017 | Fromm ................. G03B 17/566 |
| 2017/0104939 | A1 | 4/2017 | Sun |
| 2017/0192341 | A1 | 7/2017 | Casarez et al. |
| 2017/0244934 | A1 | 8/2017 | Chien |
| 2018/0332204 | A1 | 11/2018 | Chien |
| 2018/0335684 | A1 | 11/2018 | Strauser |
| 2019/0246019 | A1 | 8/2019 | Tian et al. |
| 2020/0225562 | A1 | 7/2020 | Zheng et al. |
| 2023/0079163 | A1 * | 3/2023 | Noh ....................... H04N 23/45 348/135 |

FOREIGN PATENT DOCUMENTS

| | | | | |
|---|---|---|---|---|
| CN | | 203210063 U | | 9/2013 |
| CN | | 204284853 U | | 4/2015 |
| CN | | 104670512 A | | 6/2015 |
| CN | | 104691774 A | * | 6/2015 |
| CN | | 104786801 A | | 7/2015 |
| CN | | 105185154 A | | 12/2015 |
| CN | | 205510225 U | | 8/2016 |
| CN | | 106502029 A | | 3/2017 |
| CN | | 106691551 A | | 5/2017 |
| CN | | 206341304 U | | 7/2017 |
| CN | | 207397503 U | | 5/2018 |
| CN | | 207867197 U | | 9/2018 |
| CN | | 207869212 U | | 9/2018 |
| CN | | 216852139 U | * | 6/2022 |
| EP | | 1744208 A1 | | 1/2007 |
| JP | | H04336993 A | | 11/1992 |
| JP | | 2016065982 A | | 4/2016 |
| KR | | 20120128740 A | * | 11/2012 |
| WO | | 2011028092 A1 | | 3/2011 |
| WO | WO-2017067520 A1 | * | 4/2017 | ............. H04N 5/232 |

OTHER PUBLICATIONS

International Search Report in PCT/CN2018/107355 dated Dec. 28, 2018, 7 pages.
Written Opinion in PCT/CN2018/107355 dated Dec. 28, 2018, 6 pages.
Extended European Search Report in European Application No. 18862058.7 dated May 12, 2020, 7 pages.
Communication Pursuant to Article 94(3) EPC in European Application No. 18862058.7 dated Apr. 30, 2021, 4 pages.
The Extended European Search Report in European Application No. 23173499.7 dated Aug. 4, 2023, 7 pages.

* cited by examiner

SURVEILLANCE DEVICE

CROSS REFERENCE TO RELATED APPLICATIONS

This application is a divisional application of U.S. patent application Ser. No. 16/831,930, filed on Mar. 27, 2020, which is a Continuation of International Application No. PCT/CN2018/107355, filed on Sep. 25, 2018, which claims priority to Chinese Application No. 201721254781.2, filed on Sep. 27, 2017, Chinese Application No. 201721755337.9, filed on Dec. 15, 2017, and Chinese Application No. 201721756732.9, filed on Dec. 15, 2017, the entire contents of each of which are hereby incorporated by reference.

TECHNICAL FIELD

The present disclosure relates to surveillance devices and in particular to surveillance devices that include cameras.

BACKGROUND

A surveillance device such as a video monitoring device may be used to monitor certain areas. For example, a surveillance device with a camera may be often used in a parking lot management system to monitor parking spaces in a parking lot. However, this device may be expensive and can be vulnerable to vandalism. Furthermore, an existing parking lot management device mainly use video images of a parking space in a parking lot to determine the corresponding parking space state (e.g., whether the parking space is occupied). However, the camera may be of a relatively poor quality in a relatively weak ambient light, resulting in a relatively inaccurate determination of the parking space state. Accordingly, for addressing such issues, it may be desirable to provide a device and a method for monitoring a parking space.

SUMMARY

A first aspect of the present disclosure relates a device comprising a support bar, a mounting housing mounted with a camera lens, and a connector configured to connect the support bar to the mounting housing. The mounting housing is integrally rotatable with the connector with respect to the support bar.

In some embodiments, the support bar forms a plurality of engaging holes thereon, the connector forms an engaging means therein which is engaged with at least one of the engaging holes through an engaging mechanism.

In some embodiments, the plurality of engaging holes are arranged in a circumferential direction of the support bar.

In some embodiments, the plurality of engaging holes include a plurality of thread holes, and the engaging mechanism includes at least one through-hole.

In some embodiments, the engaging mechanism includes a bolt engaging the through-hole with the at least one of the threaded holes.

In some embodiments, the through-hole is a strip-type hole, and wherein when engaged with at least one of the threaded holes, the strip-type hole extends in a circumferential direction of the support bar.

In some embodiments, the plurality of threaded holes are arranged respectively on the support bar in a circumferential direction at a certain interval.

In some embodiments, the mounting housing is further mounted with an ultrasonic probe and a lightening device.

In some embodiments, the ultrasonic probe is configured to monitor a predefined change, and the camera lens and the lightening device is controlled at least by the monitored change.

A second aspect of the present disclosure relates a device comprising an ultrasonic probe, a lightening device, and a support bar configured to support the ultrasonic probe and the lightening device.

In some embodiments, the device further includes a mounting housing which is supported by the support bar and mounted with the ultrasonic probe and the lightening device.

In some embodiments, the mounting housing may include a front housing, a rear housing, and a seal diaphragm arranged between the front housing and the rear housing.

In some embodiments, the device may further include a first seal washer arranged between the front housing and the seal diaphragm.

In some embodiments, the device may further include a second seal washer arranged between the seal diaphragm and the rear housing.

A third aspect of the present disclosure relates a device comprising a camera housing which forms an opening on a side wall of the camera housing, and a camera lens in the camera housing and facing the opening of the camera housing.

In some embodiments, the opening is covered by a window.

In some embodiments, at least part of the window is transparent.

In some embodiments, the window is configured to allow access to the opening.

In some embodiments, the side wall is mounted with a sliding rail, and the window is slidably mounted on the side wall of the camera housing along the sliding rail.

A fourth aspect of the present disclosure relates to a device comprising a first camera which is rotatable around a first axis and a second camera which is rotatable around a second axis, wherein the first axis is in a direction of the second axis.

In some embodiments, the first axis is parallel to the second axis.

In some embodiments, the first axis is the same as the second axis.

In some embodiments, the first camera and the second camera are respectively rotatable around the first axis.

In some embodiments, the first camera has a first camera housing and a first lens assembly arranged in the first camera housing. The second camera has a second camera housing and a second lens assembly arranged in the second camera housing. At least one of the first camera housing or the second camera housing includes a window.

In some embodiments, the first camera and the second camera are interconnected through a connecting module. The connecting module may include a switching board with an opening thereon and a switching shaft comprising a shaft component and a disc component connected to the shaft component. The shaft component goes through the opening, and the shaft component is rotatable with respect to the switching board around an axis of the shaft component.

In some embodiments, the first camera is fixedly connected with the shaft component of the switching shaft, and the second camera is fixedly connected with the switching board.

In a further aspect according to the present disclosure, a camera is provided. The camera includes a housing and a camera lens assembly. The housing is cylindrical and has an opening on the wall of the cylinder. The camera lens assembly is installed in the camera housing and disposed facing a window of the camera housing.

In some embodiments, the camera lens assembly is disposed in the cylindrical camera housing, and the camera housing may protect the camera lens assembly. Moreover, a window is provided on the wall of the camera housing. The camera lens assembly faces the window setting. The lens component may perform monitoring and shoot through the window, and the lens angle may be adjusted through the window. Therefore, the lens angle adjustment process, as well as the assembly process of the camera is relatively convenient.

In some embodiments, the camera further includes: an indicator board arranged on the bottom wall of the camera, wherein an indicator light is mounted on the side of the indicator board facing away from the housing of the camera.

In some embodiments, the camera further includes an indicator cover disposed on the side of the indicator plate facing away from the camera housing.

In some embodiments, in each camera, a lens window (or simply referred to as a window) that may open and close the opening is mounted on the housing wall of the camera, and the material of the lens window is transparent.

In some embodiments, the lens window is slidable along a wall of the camera housing to enable opening or closing of the window.

In some embodiments, the camera housing is provided with a sliding rail extending along a circumferential direction of the cylinder wall. The lens window is slidably mounted to the camera housing along the sliding rail.

In some embodiments, when the lens window slides to the first end of the sliding rail, the lens window completely closes the opening. When the lens window slides to the second end of the sliding rail, the lens window completely opens the opening.

In some embodiments, a hook is disposed on the inner side of the sliding rail. The lens window is provided with a grooved portion to be engaged with the hook. When the lens window slides to the first end of the sliding rail, the hook is engaged with the grooved portion.

In some embodiments, the lens window is further provided with a leading plane for guiding the hook into the grooved portion, and the leading plane is located at a side of the grooved portion facing the first end of the sliding rail.

In some embodiments, an elastic arm is provided on the inner side of the sliding rail, and the elastic arm is disposed along an extension direction of the sliding rail. The hook is disposed at the end of the elastic arm facing the first end of the sliding rail.

In some embodiments, the hook is disposed at the first end of the sliding rail.

In some embodiments, the camera further includes a supporting structure for the lens assembly. For example, the camera further includes a fixing frame of the camera lens assembly. The fixing frame of the camera lens assembly is fixedly mounted on a bottom wall of the camera housing. The camera lens assembly is mounted on the fixing frame of the camera lens assembly.

In some embodiments, the camera lens assembly is spherical. The fixing frame of the camera lens assembly is provided with a spherical cavity matched with the camera lens assembly. The camera lens assembly is rollably mounted within the spherical cavity with respective to the spherical cavity.

In some embodiments, the inner side of the spherical cavity is covered with a damping structure.

In some embodiments, the indicator cover includes an indicator board frame mounted on the bottom wall of the housing and a translucent cover mounted on the indicator board frame. The transparent cover is made of the hemispherical uniform material.

A multi-directional camera comprising: at least two camera modules, each of the at least two camera modules including a housing and a camera lens assembly mounted in the housing, wherein the housing is cylindrical and has an opening on the wall of the cylinder. The shaft axis of the at least two housings of the at least two camera modules coincide with each other. The at least two camera modules are sequentially arranged along the direction of the shaft axis, and any two adjacent camera modules are respectively rotatable around the shaft axis. As used herein, the first camera module may be referred to as a first camera. The second camera module may be referred to a second camera. The housing and the camera lens assembly of the first camera module may be referred to as a first camera housing and a first lens assembly, respectively. Likewise, the housing and the camera lens assembly of the second camera module may be referred to as a second camera housing and a second lens assembly, respectively. The shaft axis of a camera module housing may simply be referred to as the shaft axis of the camera (e.g., the first camera, or the second camera).

The multi-directional camera described above includes at least two camera modules. In the multi-directional camera, at least two camera modules are sequentially arranged along the axis direction of the housing and are rotatably connected about the shaft axis. Therefore, the relative rotation between the plurality of lens assemblies in the horizontal direction (i.e., perpendicular to the direction of the shaft axis) can be adjusted by driving relative rotation between the camera modules. Moreover, since the housing of each camera module has a cylindrical shape and an opening is mounted on the cylinder wall. The shooting angle of the camera lens assembly can be further adjusted through the opening.

In summary, the multi-directional camera provided according to some embodiments of the present disclosure can relatively rotate the camera module in the horizontal direction, which performs the angle adjustment of each camera lens assembly in the horizontal direction. On the other hand, the camera lens assembly can be directly adjusted in the horizontal (i.e., perpendicular to the axis direction) and/or the vertical direction (e.g., parallel to the direction of the shaft axis) through the opening on the housing. Therefore, the lens angle adjustment range of the multi-directional camera is extensive, and the adjustment process does not require tools, which is very convenient. Furthermore, the multi-directional camera can be used for parking space detection, and can well meet the monitoring requirements of different parking space scenes.

In some embodiments, any adjacent two camera modules are connected by a switching module (or referred to as a connecting module). The switching module includes: an adapter plate (or referred to as a switching board) having an opening. Moreover, a switching shaft provided with a shaft component and a disc component is connected to the first end of the shaft component, the shaft component penetrating through the opening of the adapter plate. The diameter of the disc component is larger than the diameter of the opening of the adapter plate. The switching shaft is rotatable relative to the adapter plate about an axis of the shaft component.

In some embodiments, a side of the adapter plate facing toward the disc component is mounted with a hook. A side of the disc component facing away from the adapter plate is formed with a grooved portion to be engaged with the hook.

In some embodiments, the grooved portion is a ring groove arranged along a peripheral of the disc component. The adapter plate is provided with a plurality of the hooks, and the plurality of hooks are evenly distributed along the peripheral of the disc component.

In some embodiments, a damping strip is arranged between the disc component and the adapter plate.

In some embodiments, a side of the disc component facing the adapter plate is provided with a plurality of strip-shaped mounting grooves surrounding the shaft component, and the damping strip is mounted in the mounting groove.

In some embodiments, in any two adjacent camera modules, the camera module near the top side of the at least two camera modules is a first camera module. Moreover, the camera near the bottom side of the at least two camera modules is a second camera module. The housing of the first camera module is fixedly connected with the shaft component of the switching shaft. The housing of the second camera module is fixedly connected with the adapter plate.

In some embodiments, the second end of the shaft component is provided with a mounting hole. The housing of the first camera module and the shaft component are fixedly connected by a fixing component inserted into the mounting hole.

In some embodiments, the adapter plate is provided with a through-hole, and the housing and the adapter plate of the second camera module are fixedly connected by a fixing component inserted into the through-hole.

In some embodiments, the adapter plate is provided with a position-limiting mechanism toward a side of the first camera module. The housing of the first camera module is arranged toward a side of the adapter plate and a fastener is corresponding to the position limiting mechanism. The position-limiting mechanism and the fastener may be mutually constrained or blocked when the first camera module and the adapter plate are relatively rotated.

In some embodiments, the multi-directional camera further includes: an indicator board mounted on the side of a bottom end of the at least two camera modules, wherein an indicator light is mounted on the indicator board. An indicator board frame arranged on the side of the indicator board facing away from the at least two camera modules. An indicator transparent cover mounted on the indicator board frame.

In some embodiments, the indicator board frame is mounted on a housing of the bottommost camera module, and the indicator board frame connects with the housing of the bottommost camera module by the buckle.

In some embodiments, the indicator light transparent cover connects with the indicator board frame by the buckle.

In some embodiments, in each camera module, a lens window that can open and close the opening is mounted on the housing, and the material of the lens window is transparent.

In some embodiments, the cylinder wall of the housing is provided with a sliding rail extending along a circumferential direction thereof. The lens window is slidable along the slide rail to achieve opening and closing of the opening.

In some embodiments, the camera module further includes a fixing frame of the camera lens assembly. The fixing frame of the camera lens assembly is fixedly mounted on a bottom wall of the housing of the camera module. The camera lens assembly is mounted on the fixing frame of the camera lens assembly.

In some embodiments, the camera lens assembly is spherical. The fixing frame of the camera lens assembly is provided with a spherical cavity matched with the camera lens assembly. The camera lens assembly is rollably mounted within the spherical cavity relative to the spherical cavity.

In some embodiments, the inner side of the spherical cavity is covered with a damping structure.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
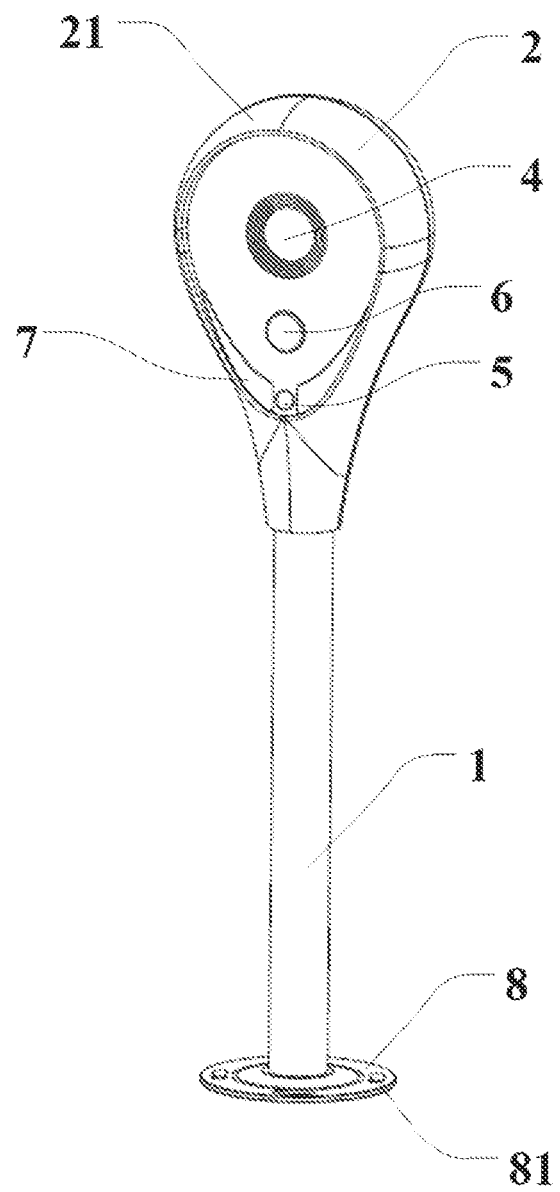
FIG. 1 is a structure diagram illustrating a first side of a surveillance device according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

The modules (or units, blocks, units) described in the present disclosure may be implemented as software and/or hardware modules and may be stored in any type of non-transitory computer-readable medium or other storage device. In some embodiments, a software module may be compiled and linked into an executable program. It will be appreciated that software modules can be callable from other modules or from themselves, and/or can be invoked in response to detected events or interrupts. Software modules configured for execution on computing devices can be provided on a computer readable medium, such as a compact disc, a digital video disc, a flash drive, a magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in a firmware, such as an EPROM. It will be further appreciated that hardware modules (e.g., circuits) can be included of connected or coupled logic units, such as gates and flip-flops, and/or can be included of programmable units, such as programmable gate arrays or processors. The modules or computing device functionality described herein are preferably implemented as hardware modules, but can be software modules as well. In general, the modules described herein refer to logical modules that can be combined with other modules or divided into units despite their physical organization or storage.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts.

Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

An aspect of the present disclosure may provide a surveillance device to improve the accuracy of the intelligent parking lot management system for monitoring the parking space state, and improve the working efficiency of the surveillance device. The surveillance device may include a connector, a support bar, and a mounting housing mounted with a camera lens. The mounting housing is integrally rotatable with the connector with respect to the support bar. Thus, the facing angle of the camera lens may be adjusted in a comparatively convenient manner by adjusting the relative position of the connector and the support bar. Furthermore, the mounting housing may be mounted with an ultrasonic probe configured to detect a change of the occupation state of the parking space it is monitoring, and a supplement light to light up the parking space when the camera lens is working, allowing a more accurate determination of the occupation state of the parking state when the ambient light is relatively weak. Another aspect of the present disclosure may provide a camera with an opening formed in its housing. The facing angle of the camera lens located inside the housing may be adjusted in a relatively convenient manner through the opening. A further aspect of the present disclosure may provide a camera with a first camera module and a second camera module. The housings of the two camera modules share a same shaft axis, around which the two camera modules are respectively rotatable. Such a structure may allow the camera to monitor areas in different directions simultaneously.

1: support bar, 11: threaded hole, 2: mounting housing, 21: front mounting housing, 22: rear mounting housing, 23: seal diaphragm, 231: cable tie, 3: connector, 31: through-hole, 32: screw mounting hole, 4: camera lens, 5: supplement light, 6: ultrasonic probe, 7: indicator, 8: mount, 81: mounting through-hole 10: camera cover; 120: camera housing; 1120: bottom wall; 20: transparent ring; 220: camera lens assembly; 30: transparent housing fixing base; 320: indicator board frame; 40: camera lens assembly; 420: transparent cover; 50: transparent lens housing; 520: lens window; 51: hook; 52: leading plane; 620: sliding rail; 61: first end of the sliding rail; 62: second end of the sliding rail; 63: grooved portion; 64: elastic arm; 720: lens assembly holder; 71: spherical cavity; 8120: bolt; 82: bolt; 91: fixing portion; 1030: camera cover; 130: camera module; 1130: housing; 13: lens window; 12: camera lens assembly; 111: bottom wall; 112: stopper; 14: fixing frame; 141: spherical cavity; 2030: transparent indicator ring; 230: adapter plate; 2130: opening; 2230: hook; 2330: through hole; 2430: limiting structure; 3030: transparent housing fixing base; 330: switching shaft; 31: through-hole; 32: screw mounting hole; 4030: camera lens assembly; 430: damping strip; 311: mounting hole 321: ring groove; 322: mounting groove; 5030: transparent housing; 530: camera cover; 5130: fixing portion; 630: mounting plate; 730: indicator board; 6130: fixing nut; 830: indicator board frame; 930: transparent indicator cover.

Some embodiments of the present disclosure provide a surveillance device to improve the accuracy of an intelligent parking lot management system's determination of a parking space state, and with an improved efficiency.

In some embodiments, as shown in FIG. 1 to FIG. 5, a surveillance device may include a support bar 1, a mounting housing 2 and a connector 3 for connecting the support bar 1 and the mounting housing 2. In some embodiments, the connector 3 may be fixed to the mounting housing 2. In some embodiments, the connector 3 may be connected with the support bar 1 through one more screws fitting into one or more threaded holes 11 in an end of the support bar 1. The mounting housing 2 may be integrally rotatable with the connector 3 with respect to the support bar 1.

In some embodiments, a plurality of threaded holes 11 may be evenly distributed on one end of the support bar 1 in the circumferential direction. That is, the plurality of threaded holes 11 are arranged around the support bar 1 with a fixed interval between every two threaded holes. In some embodiments, the facing direction of the mounting housing 2 may be adjusted to variable directions. The angle differences between every two adjacent directions may be of the same interval.

The mounting housing 2 may be located at one end of the support bar 1. The side of the support bar 1 that is close to the mounting housing 2 forms the plurality of threaded holes 11 thereon in the circumferential direction of the support bar 1. The connector 3 has at least one through-hole 31 facing at least one of the threaded holes 11.

Figure 5:
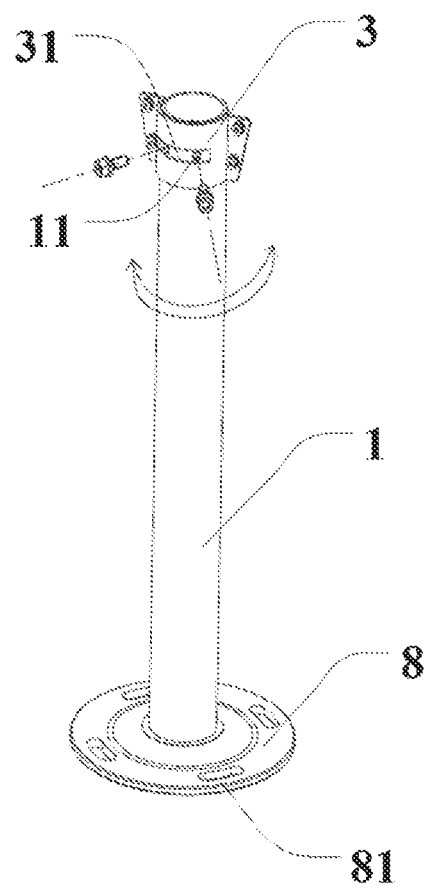
FIG. 5 is a structure diagram illustrating a support bar and a connector according to some embodiments of the present disclosure.
Figure 6:
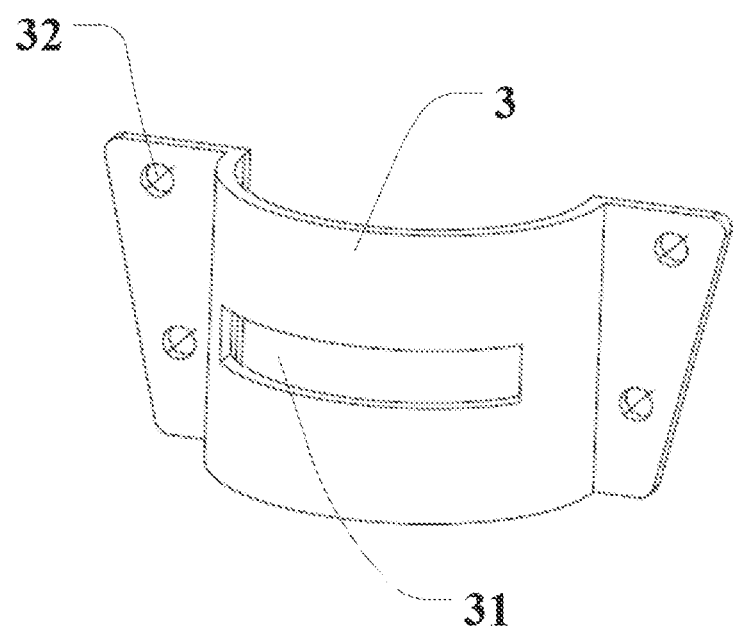
FIG. 6 is a structure diagram illustrating a connector according to some embodiments of the present disclosure.

Referring to FIG. 5 and FIG. 6, the through-hole 31 may be a strip-type hole. When the connector 3 is mounted to the support bar 1, the strip-type hole extends along the circumferential direction of the support bar 1. When installing the connector 3, the strip-type hole may be engaged with the corresponding threaded hole 11 through an engaging mechanism, such as a screw, a bolt, or the like, or any combination thereof. For example, an engaging mechanism may pass through the strip-type hole and a threaded hole 11 successively, connecting the strip-type hole and the threaded hole 11. One may adjust the relative position of the strip-type hole and the corresponding threaded hole 11 before tighten the screw, in order to achieve a fine adjustment of the facing angle of the mounting housing 2 and the facing direction camera lens 4.

In some embodiments, the strip-type hole may face two or more threaded holes 11 in the support bar 1, and the connector 3 may be fixed to the two or more threaded holes 11 by two or more screws, which may improve the mounting stability thereof.

The mounting housing 2 may be mounted with an ultrasonic probe 6 for detecting whether a vehicle is entering or leaving the parking space or not. When the ultrasonic probe 6 detects that there may be a vehicle entering or leaving the parking space, the camera lens 4 and the supplement light 5 may be switched on. In some embodiments, the ultrasonic probe 6, the camera lens 4, and/or the supplement light 5 (or referred to as a lightening device) may connect to a controller. In some embodiments, the controller connected to the ultrasonic probe 6, the camera lens 4, and/or the supplement light 5 may be not specifically limited. For example, in some embodiments, the surveillance device may include at least one camera for monitoring vehicles in a parking space. The controller may be a chip installed in the at least one camera, or may be a control platform connected to the at least one camera. The ultrasonic probe 6 may scan a certain position of the parking space. When the ultrasonic probe 6 detects that a vehicle is entering or leaving the parking space, the controller may switch on the camera lens 4 and the supplement light 5. The camera lens 4 may record vehicle information under the illumination of the supplement light 5.

In one aspect, the ultrasonic probe 6 uses ultrasonic waves to monitor the state of the parking space, which is not affected by the ambient light, making a more accurate determination of the parking space state. In another aspect, the camera lens 4 and the supplement light 5 is switchable according the change in the occupation state of the parking state monitored by the ultrasonic probe 6. When the ultrasonic probe 6 detects that the vehicle may be entering or leaving the parking space, the controller starts the camera lens 4 and supplement light 5, both of which may otherwise be in a closed state, improving the efficiency of the surveillance device.

The connector 3 may connect the mounting housing 2 to the support bar 1. The connector 3 may be disposed to face a certain threaded hole 11 on the support bar 1, according to specific application scenarios. By changing the threaded hole 11 which the connector 3 faces, the facing direction of the mounting housing 2, and thus the facing direction of the camera lens 4 and the ultrasonic probe 6 mounted on the mounting housing 2 may be adjusted. In some embodiments, due to the fact that the facing direction of the camera lanes may be adjusted after the install of the support bar 1 is completed, the support bar 1 may be installed on the ground in a relatively simplified manner in which there is no need to consider whether the facing direction of the camera lens is in a pre-defined direction. In some embodiments, after the surveillance device is installed, whenever there is a need to adjust the facing direction of the camera lens 4, one can simply open the screw connecting the connector 3 and the support bar 1 and adjust the facing direction of the camera lens 4 accordingly. The adjustment process may be relatively convenient.

Figure 2:
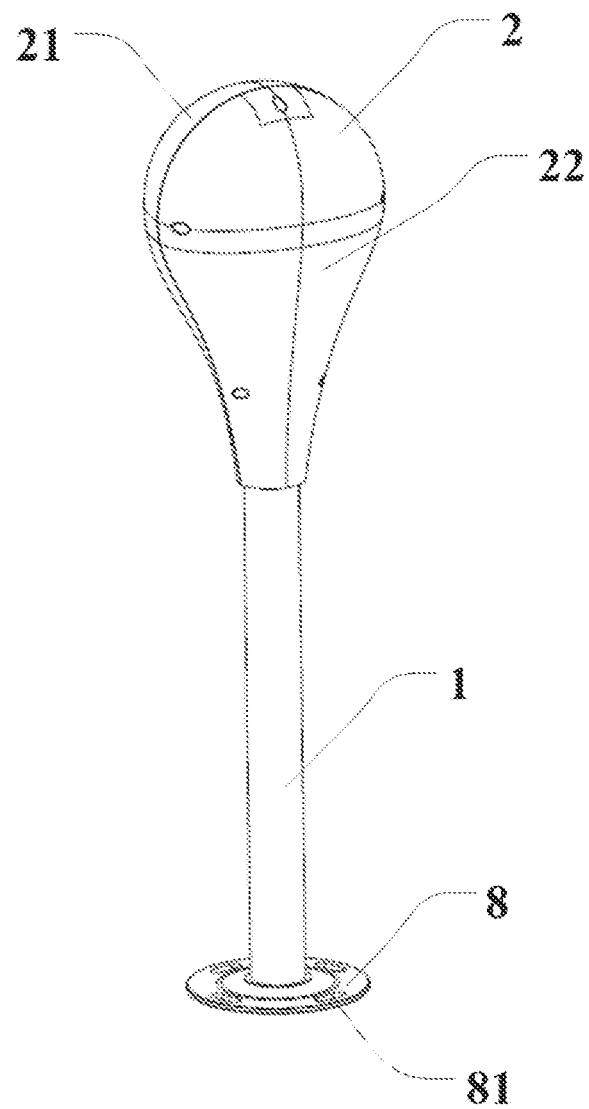
FIG. 2 is a structure diagram illustrating a second side of a surveillance device according to some embodiments of the present disclosure.
Figure 3:
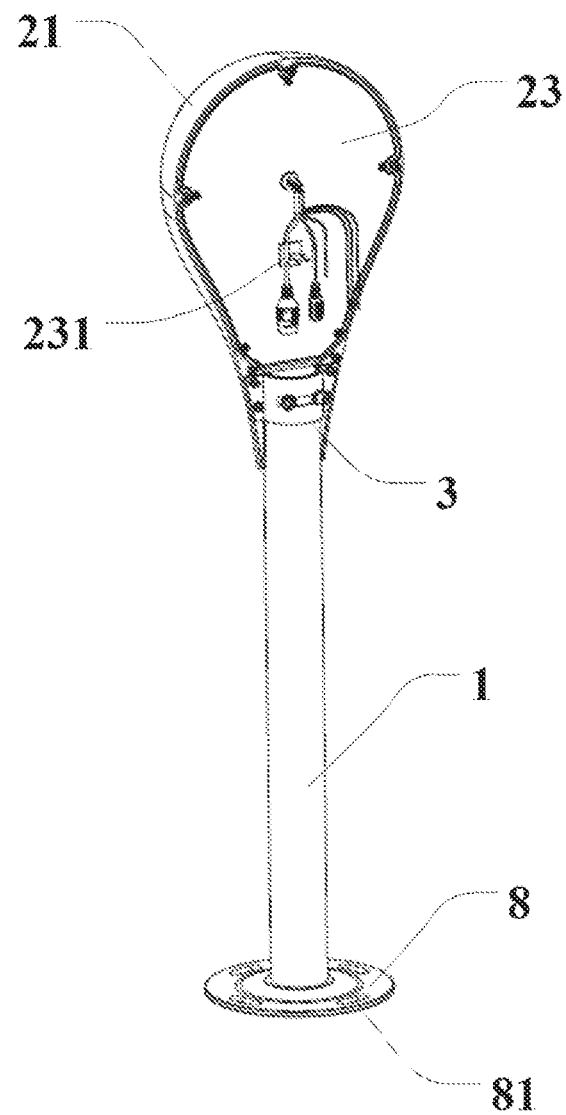
FIG. 3 is a structure diagram illustrating the installation of a mounting housing on a support bar according to some embodiments of the present disclosure.

Referring to FIG. 1 to FIG. 3, the mounting housing 2 includes a front mounting housing 21 (or referred to as a front housing) for mounting the camera lens 4, the supplement light 5 and the ultrasonic probe 6, a rear mounting housing 22 (or referred to as a rear housing), and a seal diaphragm 23 arranged between the front mounting housing 21 and the rear mounting housing 22. In some embodiments, a front seal washer (or referred to as a first seal washer) may be provided between the seal diaphragm 23 and the front mounting housing 21.

In some embodiments, when the camera lens 4, the supplement light 5 and the ultrasonic probe 6 are mounted on the front mounting housing 21, and a front seal washer is provided between the seal diaphragm 23 and the front mounting housing 21, the camera lens 4, the supplement light 5 and the ultrasonic probe 6 may be sealed in the cavity formed between the front mounting housing 21 and the seal diaphragm 23, protecting the surveillance device from contamination and/or damage of moisture, dust, and the like.

In some embodiments, a rear seal washer (or referred to as a second seal washer) may be provided between the seal diaphragm 23 and the rear mounting housing 22. The sealing diaphragm 23 may be provided with sealing washers on its both sides, which may improve the sealing property of the mounting housing 2 and further improve the waterproof performance of the mounting housing 2.

Referring to FIG. 3, a cable tie 231 may be provided on one side of the seal diaphragm 23 and face the rear mounting housing 22. The cable tie 231 is accommodated in a cavity that is formed between the rear mounting housing 22 and the seal diaphragm 23. In some embodiments, the cable tie 231 may be used to facilitate the connection of the cables of the surveillance device and to make the connection more reliable.

The manner in which the connector 3 and the mounting housing 2 are connected may be not limited. For example, the connector 3 and the mounting housing 2 may be connected through welding, riveting, or the like, or any combination thereof. Technicians may also design other connection manners according to specific application scenario. In some embodiments, the connector 3 may be fixed to the mounting housing 2, and therefore, the mounting housing 2 may be integrally rotatable with the connector 3 with respect to the support bar 1.

In some embodiments, the connector 3 and the mounting housing 2 may be connected through a screw. Referring to FIG. 6, the connector 3 includes a screw mounting hole 32 into which a screw may be inserted. The connector 3 and the mounting housing 2 may be fixed together by inserting a screw through the screw mounting hole 32 and a corresponding mounting hole of the mounting housing 2. The fact that the connector 3 and the mounting housing 2 being fixed through a screw may facilitate the disassembly and assembly therebetween, and the connection stability therebetween may be relatively good.

Referring to FIG. 1, the mounting housing 2 may also include an indicator 7. The indicator 7 may be configured to indicate the occupied state of the parking space. In some embodiments, the indicator 7 may include two indicators or three indicators. For example, the indicator 7 includes two indicators, a red indicator and a green indicator. When there is no car parking in the parking space, the green indicator may be powered on. When there is a car parking in the parking space, the red indicator may be powered on. As a result, it may be available for the drivers to identify an unoccupied parking space at a remote location based on the indicator (e.g., the color of the indicator).

Figure 4:
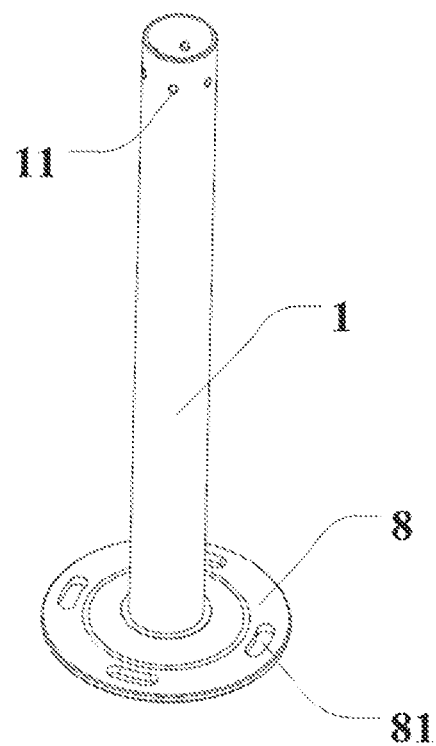
FIG. 4 is a structure diagram illustrating a support bar according to some embodiments of the present disclosure.

Referring to FIG. 4, an end of the support bar 1 facing away from the mounting house 2 may include a mount 8. The mount 8 may include a plurality of through-holes 81. When installing a surveillance device, it may be necessary to establish a mounting base and then install the surveillance device on the mounting base. In some embodiments of the present disclosure, the mount 8 may be mounted on the mounting base so that the support bar 1 may be firmly mounted on the ground. In some embodiments, the mount 8 may be fixed by inserting a rivet or a bolt through the through-holes.

Apart from the surveillance device as illustrated in FIG. 1 to FIG. 6, the present disclosure also provides a surveillance device having a structure as illustrated in FIG. 8 to FIG. 17. Compared to the existing surveillance device whose structure may be illustrated in FIG. 7, the surveillance device provided in the present disclosure may have a camera with an opening formed in its housing. The facing angle of the camera lens located inside the housing may be adjusted in a relatively convenient manner through the opening. In some embodiments, the surveillance device may be used to monitor a parking space. Thus, the surveillance device may be referred to as a parking space detector (e.g., a camera).

Figure 7:
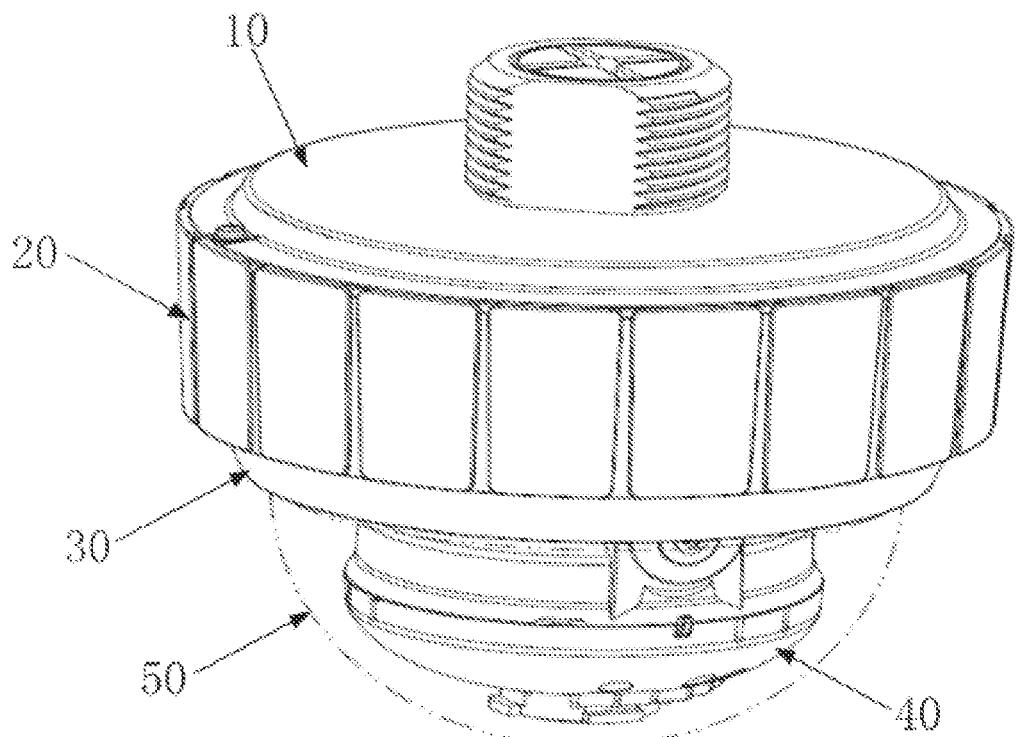
FIG. 7 is structure diagram illustrating a camera in the prior art.

FIG. 7 is structure diagram illustrating a camera in the prior art. The parking space detector is a security monitoring device that is applied in the intelligent parking lot management system to realize the parking space guiding and car finding functions of the intelligent parking lot. When monitoring a single-sided parking space, a monocular camera similar to that shown in FIG. 1 is often employed. As shown in FIG. 7, the monocular camera is generally provided with, from top to bottom, a camera cover 10, a transparent ring 20, a transparent housing fixing base 30, a camera lens assembly 40, and a transparent lens housing 50. The transparent ring 20 may be made of translucent acrylic light-homogenizing material, and an indicator board may be located inside the transparent ring 20. When a lamp bead on the indicator board changes its illumination color, the change may be presented through the transparent ring 20. The transparent housing fixing base 30 may be used for fixedly connecting the fixed transparent lens housing 50. The camera lens assembly 40 is located directly below the transparent ring 20 and is enveloped by the transparent lens housing 50.

As shown in FIG. 7, in the above-mentioned monocular camera, the lens angle of the camera lens assembly 40 is usually a preset angle determined at the time of shipment, and generally needs to be adjusted according to actual monitoring requirements. To adjust the lens angle, it is necessary to disassemble the transparent lens housing 50. After adjusting the lens angle, it is necessary to reassemble the transparent lens housing 50, which is inconvenient. Therefore, existing assembly process of the existing parking space detector is often troublesome.

The present disclosure provides a camera as illustrated in FIG. 8 to FIG. 17.

As shown in FIG. 8 to FIG. 10, FIG. 14, FIG. 16 and FIG. 17, a camera includes a cylindrical camera housing 120 having an opening on the wall of the camera housing 120, and a camera lens assembly 220 installed in the camera housing 120 and disposed facing the opening of the camera housing 120.

The camera housing 120 may protect the camera lens assembly 220. Moreover, an opening is provided on the wall of the camera housing. The camera lens assembly faces the window setting. The lens component of the camera lens assembly 220 may film and monitor the outside scenario through the window. In some embodiments, the lens angle of the camera lens assembly 40 may be adjusted by changing the position of the window. Therefore, the process for adjusting the lens angle of the camera lens assembly 220, as well as the assembly process of the camera is relatively convenient.

As shown in FIG. 8 to FIG. 12, the camera may further include an indicator board that is arranged on one side of the bottom wall 1120 of the camera. An indicator is mounted on the side of the indicator board facing away from the camera housing 120 of the camera. The camera may further include an indicator cover that is disposed on the side of the indicator board facing away from the camera housing 120.

In some embodiments, more than one indicator is collectively arranged on the side of the bottom wall 1120 facing away from the camera housing 120. Therefore, the illumination of the more than one indicator is more concentrated. The indication effect is more visible, and the number of the required beads in one indicator is less, which effectively reduces the power consumption and heat dissipation requirement of the whole camera.

As shown in FIG. 8 to FIG. 10, FIG. 14 and FIG. 16 to FIG. 17, a lens window 520 may be installed before the opening formed on the wall of the camera housing 120 (or referred to as the side wall of the camera housing 120). In some embodiments, the lens window 520 is made of transparent material.

The lens window 520 may be closed when no lens adjustment is required, so as to protect the camera lens assembly 220. Since the lens window 520 is transparent, it may allow light to pass without affecting the working of the camera lens assembly 220. In addition, if the lens adjustment is required, the lens window 520 may be opened, and then an angle adjustment operation is performed through the lens window 520. The angle adjustment process of the camera is more convenient than the conventional camera, which requires the lens housing to be unscrewed for angle adjustment.

As shown in FIG. 8 to FIG. 10, FIG. 14 and FIG. 16, and FIG. 17, the lens window 520 is slidable along the wall of the camera housing 120 to change between an open status and a closed status. The operation of opening and closing the lens window 520 is very convenient. Therefore, the entire process of lens adjustment may be significantly facilitated, so that the lens angle of the camera may be adjusted at any time if needed.

As shown in FIG. 8, FIG. 14 to FIG. 17, the camera housing 120 is provided with a sliding rail 620 extending in the circumferential direction of the cameral housing 120. The lens window 520 is slidable along the sliding rail 620. Specifically, when the lens window 520 slides toward the closed status, the opening formed on the wall of the camera housing 120 may be closed, and when the lens window 520 slides toward the open status, the window opening formed on the wall of the camera housing 120 may be opened. The open status and closed status may be referred to as a first state and a second state, respectively.

Figure 14:
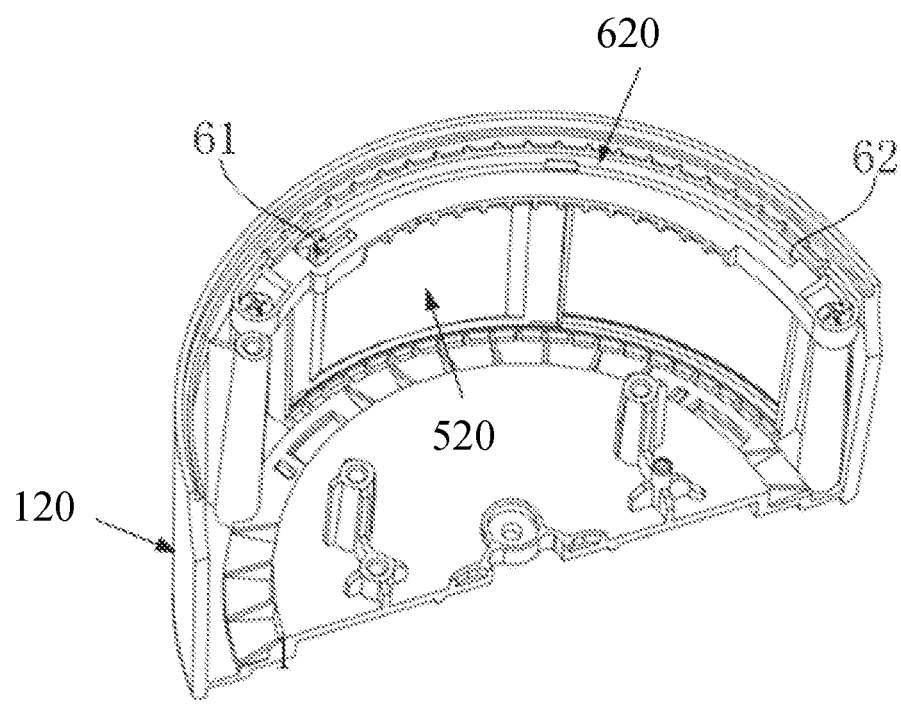
FIG. 14 is a structure diagram illustrating a camera housing, a sliding rail, and a lens window in a camera according to some embodiments of the present invention.

As shown in FIG. 14, when the lens window 520 slides to the first end 61 of the sliding rail 620, the lens window 520 may be in the close status.

Further, when the lens window 520 slides to the second end 62 of the sliding rail 620, the lens window 520 may be in the open status.

In some embodiments, as shown in FIG. 8, FIG. 14 to FIG. 17, a buckle structure may also be provided between the lens window 520 and the sliding rail 620 for ensuring the stability of the lens window 520 and the sliding rail 620 in the second state.

Figure 15:
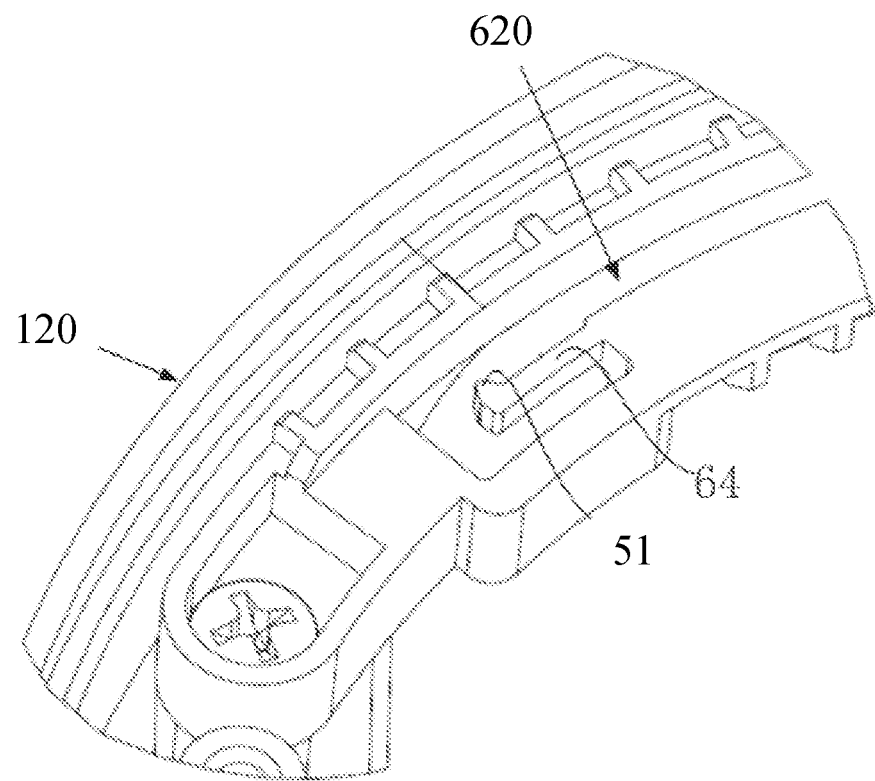
FIG. 15 is a structure diagram illustrating a sliding rail of a camera according to some embodiments of the present disclosure.
Figure 16:
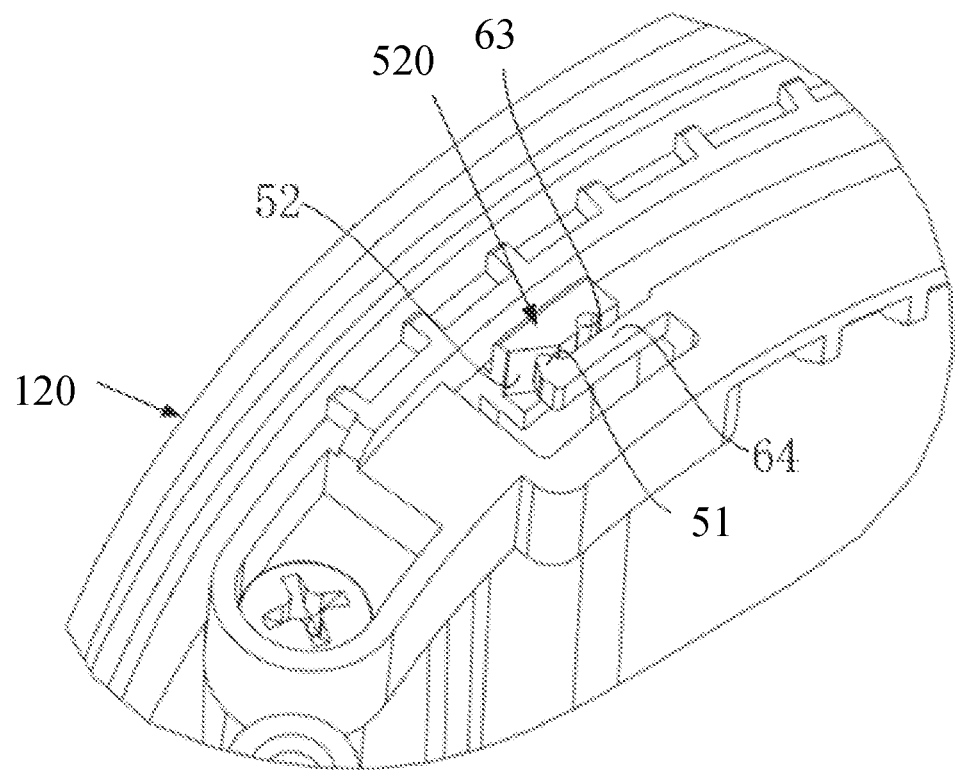
FIG. 16 is a structure diagram illustrating a sliding rail being engaged with a lens window in a camera according to some embodiments of the present disclosure.
Figure 17:
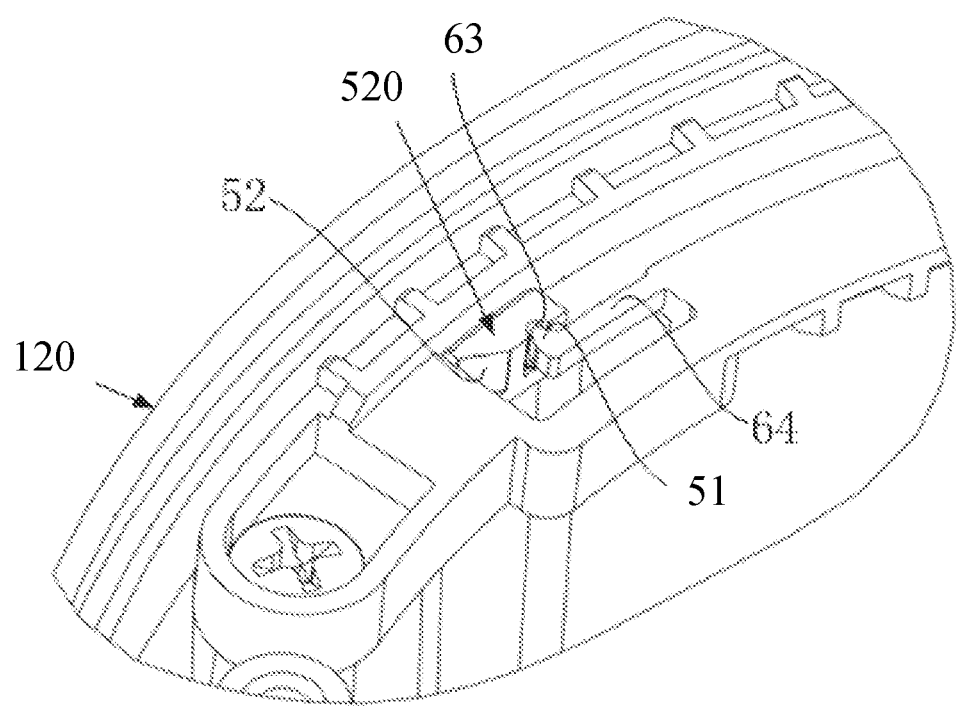
FIG. 17 is a structure diagram illustrating a sliding rail being engaged with a lens window in a camera according to some embodiments of the present disclosure.

In some embodiments, the buckle structure may be implemented in the following method. As shown in FIG. 15 to FIG. 17, the sliding rail 620 is provided with a hook 51. The lens window 520 is provided with a grooved portion 63 to be engaged with the hook 51. When the lens window 520 slides to the first end 61 of the sliding rail 620, the hook 51 engages with the grooved portion 63 to lock the lens window 520 in the second state.

The lens window 520 may be further provided with a leading plane 52 for guiding the hook 51 into the grooved portion 63. The leading plane 52 is located on the side of the grooved portion 63 facing the first end 61 of the sliding rail 620. That is, when the lens window 520 slides toward the first end 61 of the sliding rail 620, the leading plane 52 may first come into contact with the hook 51, and may gradually guide the hook 51 to the grooved portion 63 until the engagement of the hook 51 with the grooved portion 63 is achieved.

As shown in FIG. 15 to FIG. 17, an elastic arm 64 may be formed on the inner side of the sliding rail 620, and the elastic arm 64 is disposed along the extension direction of the sliding rail 620. The hook 51 is formed at one end of the elastic arm 64 toward the first end 61 of the sliding rail 620. After the leading plane 52 on the lens window 520 contacts the hook 51, the elastic arm 64 may gradually deform as the hook 51 slides along the leading plane 52 until the hook 51 is engaged with the grooved portion 63. When the grooved portion 63 is at the position, the elastic arm 64 may retain deformed. At the same time, the hook 51 at the end thereof may rebind into the grooved portion 63, thereby locking with the grooved portion 63.

As shown in FIG. 14 to FIG. 17, the hook 51 may be disposed at the first end 61 of the sliding rail 620. Correspondingly, the grooved portion 63 is disposed on the side of the lens window 520 facing the first end 61 of the sliding rail 620.

Figure 8:
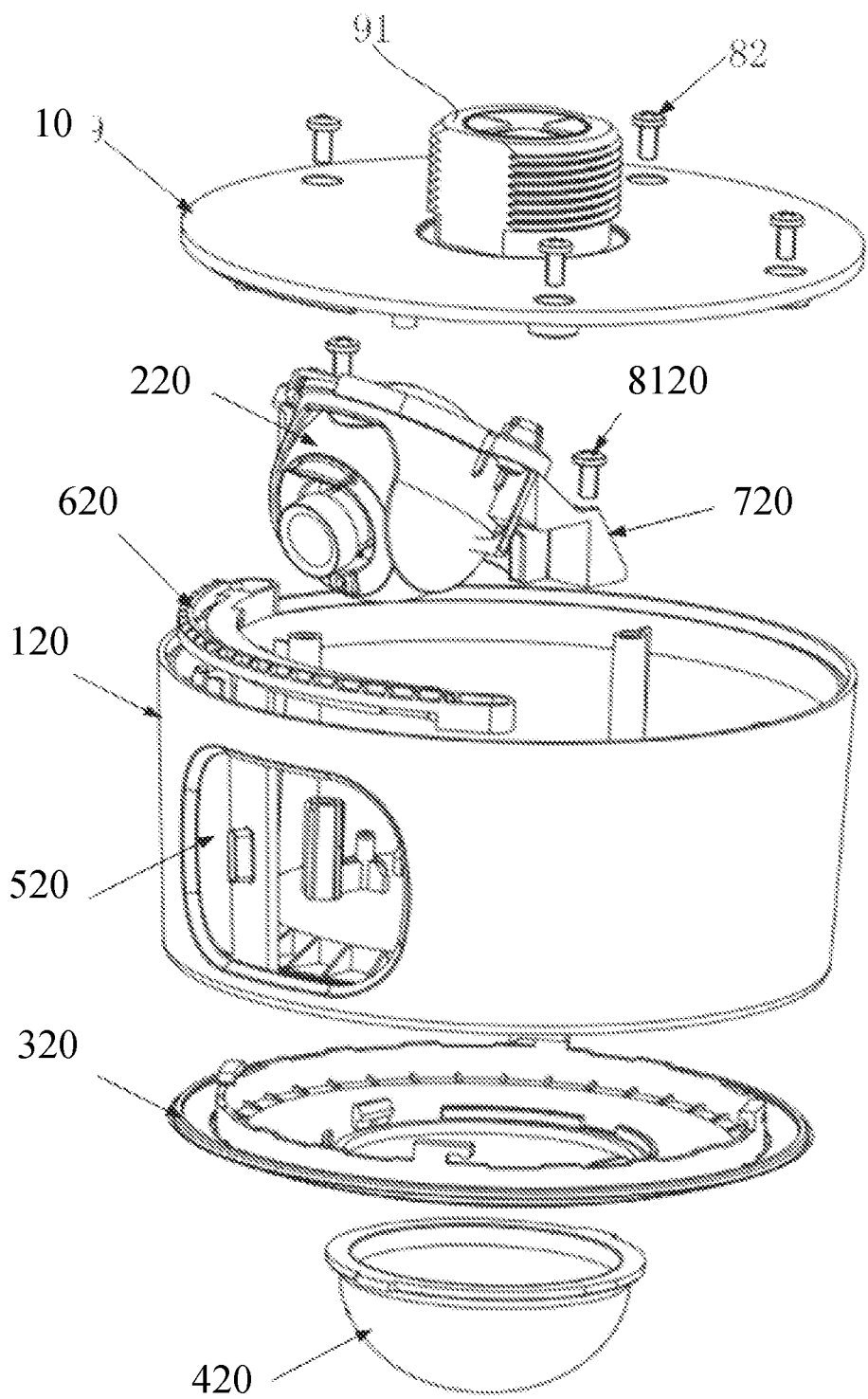
FIG. 8 is a structure diagram illustrating a camera according to some embodiments of the present disclosure.
Figure 11:
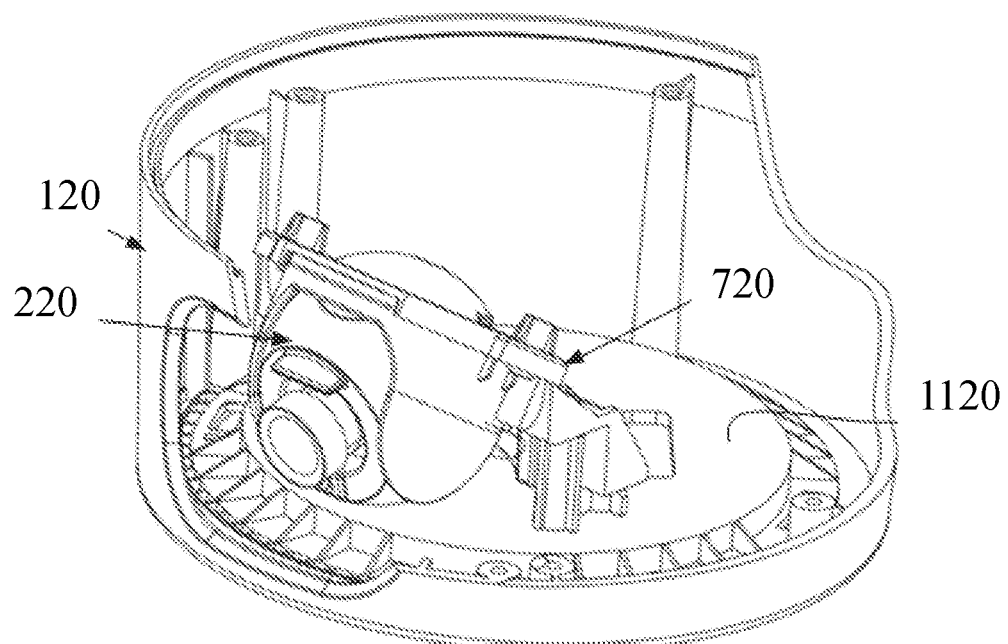
FIG. 11 is a structure diagram illustrating a camera housing, a camera lens assembly, and a fixing frame of the camera lens assembly in a camera according to some embodiments of the present invention.
Figure 12:
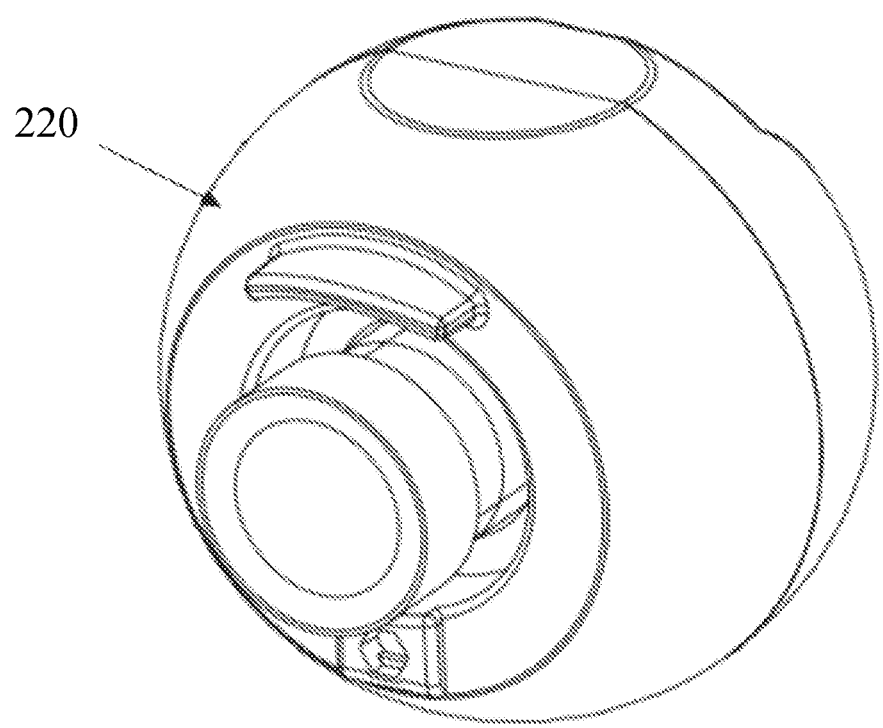
FIG. 12 is a structure diagram illustrating the camera lens assembly of a camera according to some embodiments of the present disclosure.
Figure 13:
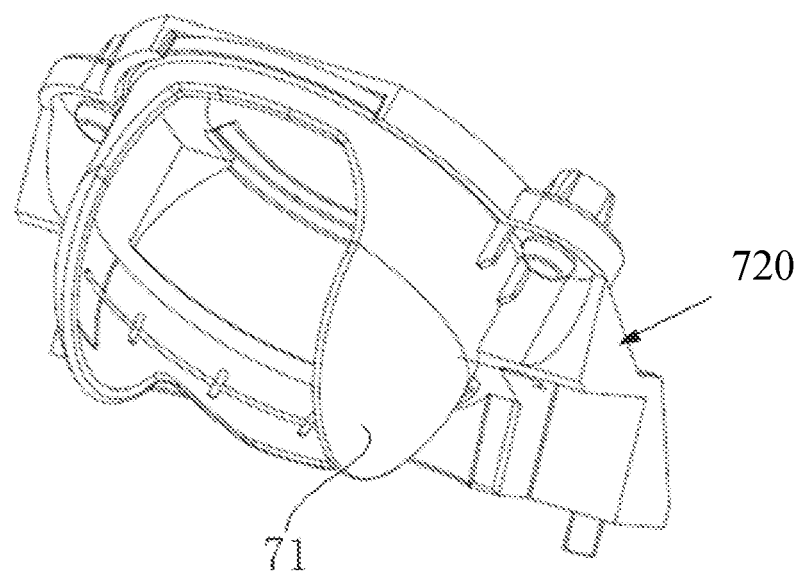
FIG. 13 is a structure diagram illustrating a fixing frame of the camera lens assembly of a camera according to some embodiments of the present disclosure.

As shown in FIG. 8, FIG. 11 and FIG. 13, the camera may further include a lens assembly holder 720. The lens assembly holder 720 is fixedly mounted to the bottom wall 1120 of the camera housing 120. Preferably, the lens assembly holder 720 may be fixedly mounted to the bottom wall 1120 of the camera housing 120 by a bolt 8120. Further, the camera lens assembly 220 is mounted on the lens assembly holder 720.

As shown in FIG. 8, FIG. 11 to FIG. 13, the camera lens assembly 220 is spherical.

Further, tAs shown in FIG. 13, the lens assembly holder 720 is provided with a spherical cavity 71 matched with the camera lens assembly 220. The camera lens assembly 220 is mounted in the spherical cavity 71 and is rotatable with respect to the spherical cavity 71.

As shown in FIG. 8, FIG. 11 to FIG. 13, a damping structure may be further provided on the inner side of the spherical cavity 71. For example, the damping foam is attached to increase the friction between the spherical cavity 71 and the camera lens assembly 220 to prevent the spherical cavity 71 from rotating under the condition of non-human intervention. For example, it is possible to prevent the spherical lens unit 220 from rotating when the camera is subjected to an accidental vibration to cause an angle change of the camera lens assembly 220.

Figure 9:
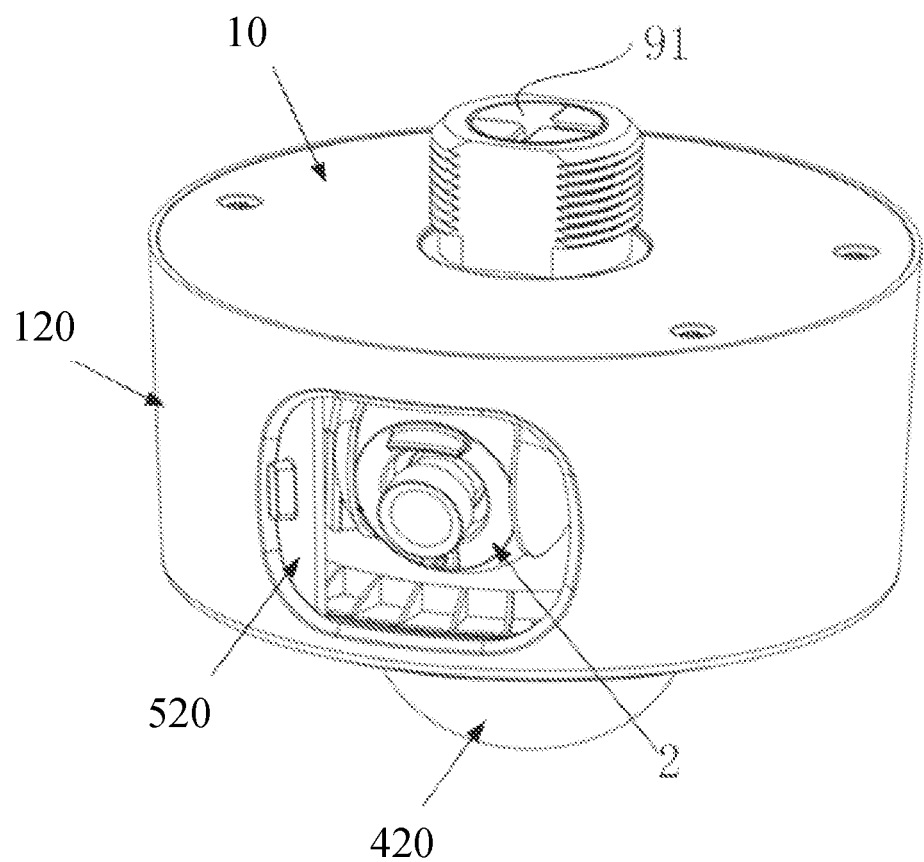
FIG. 9 is a structure diagram illustrating a camera in a first state according to some embodiments of the present disclosure.
Figure 10:
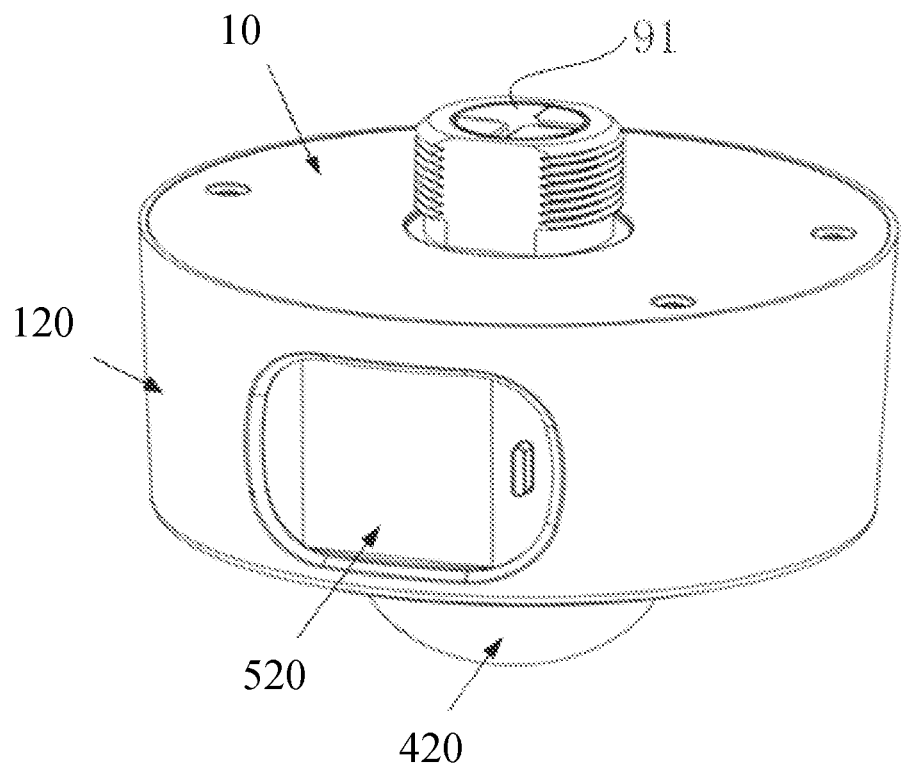
FIG. 10 is a structure diagram illustrating a camera in a second state according to some embodiments of the present disclosure.

As shown in FIG. 8 to FIG. 10, the indicator cover may include an indicator board frame 320 mounted on the bottom wall 1120 of the camera housing 120 and a transparent cover 420 mounted on the indicator board frame 320. The transparent cover 420 may be a hemispherical uniform material which may improve the uniformity of the indicating light and improve the indication effect.

As shown in FIG. 8 to FIG. 10, the transparent cover 420 and the lamp holder 320 may be connected by a buckle.

Further, the indicator board frame 320 and the bottom wall 1120 of the camera housing 120 may also be connected by the buckle.

As shown in FIG. 8 to FIG. 10, the camera may further include a camera cover 10 mounted on the top of the camera housing 120.

In some embodiments, the camera cover 10 and the camera housing 120 may be fixedly connected by one or more bolts 82.

In some embodiments, the top of the camera cover 10 has a cylindrical mounting part 91. The fixing portion 91 is provided with an external thread, which may be used for mounting the camera to an external device.

Figure 18:
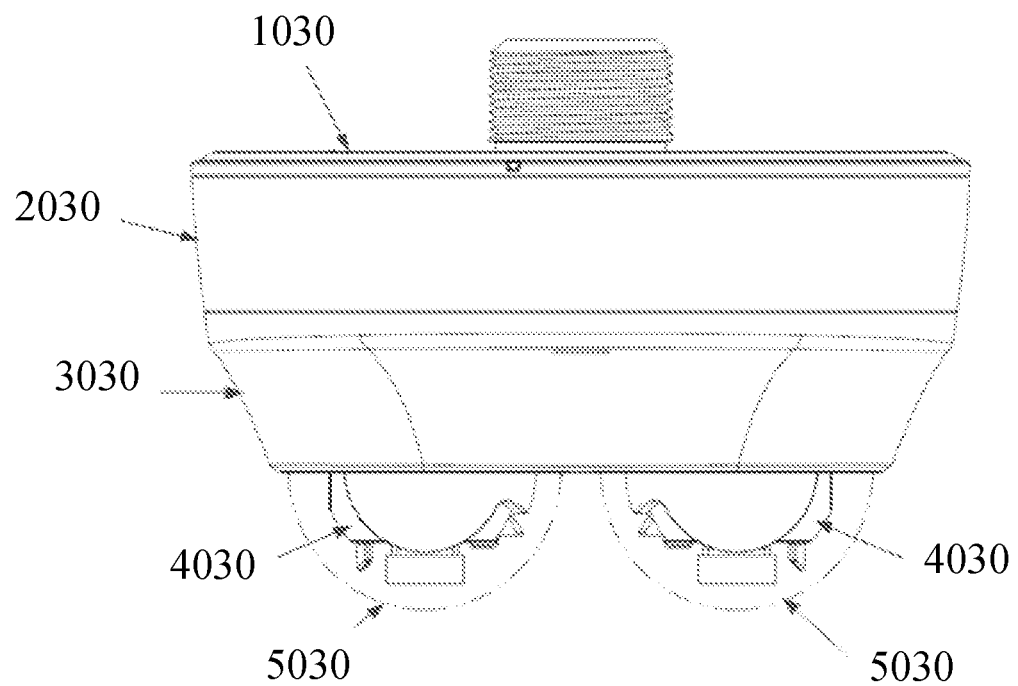
FIG. 18 is a structure diagram illustrating a binocular parking space detector in the prior art.

In the existing parking position detector products, when it is required to meet the scene requirements of monitoring two-side symmetric parking spaces or multiple parking spaces, a form similar to the binocular camera shown in FIG. 18 is often used. As shown in FIG. 18, an existing binocular camera includes, from top to bottom, a camera cover 1030, a transparent indicator ring 2030, a transparent housing fixing base 3030, two camera lens assemblies 4030, and two lens transparent housings 5030. Since both lens assemblies 4030 are arranged at the bottom of the transparent indicator ring 2030, and the outside of the two lens assemblies 4030 are covered with the transparent housing 5030, the adjustable range of the facing angles of the two lens assemblies 4030 is small, and the adjustment process also needs to disassemble the two transparent housing 5030, which is very inconvenient. Therefore, it is desirable to provide a binocular parking space detector to meet the needs of different parking space scene monitoring in a parking lot. As used herein, the angle between two lens assemblies may refer to the angle between the facing directions of the two lens assemblies.

The present disclosure discloses a multi-directional camera for solving the problem that the adjustment range for the angle between the facing angles of the two cameras is small and that the angle adjustment process is inconvenient.

As shown in FIG. 19, FIG. 20, and FIG. 25 to FIG. 28, a multi-directional camera according to some embodiments of the present disclosure includes at least two camera modules 130.

Each of the at least two camera modules 130 includes a housing 1130 and a camera lens assembly 12 mounted in the housing 1130. The housing 1130 of each camera module 130 has the shape of a cylinder. An opening is provided on the wall of the housing 1130. The housings 1130 of the at least two camera modules 130 share a same axis o. The at least two camera modules 130 are sequentially arranged along the shaft axis o, and any two adjacent camera modules 130 are rotatable about the shaft axis o, respectively.

In some embodiments, by driving a relative rotation between the camera modules, the relative position between the camera lens assemblies in the camera modules in the horizontal direction (i.e., the direction which is perpendicular to the direction of the shaft axis o) can be adjusted. The housing 1130 of each camera module 130 has an opening provided on the cylinder wall. The camera lens assembly 130 of each camera module 130 may film and monitor the outside scenario through the opening. Due to the fact that the relative position between the camera lens assemblies in the camera modules may be adjusted, the facing angle of each camera lens assembly and the position of each opening can be further adjusted.

The multi-directional camera provided according to some embodiments of the present disclosure can rotate the camera module 130 in the horizontal direction, which performs the angle adjustment of each camera lens assembly 12 in the horizontal direction. On the other hand, the camera lens assembly 12 can be directly adjusted in the horizontal and/or the vertical direction (i.e., the direction which is parallel to the direction of the shaft axis o). Therefore, the lens angle adjustment range of the multi-directional camera is broad, and the adjustment process is very convenient. Furthermore, the multi-directional camera can be used for parking space detection, and can well meet the monitoring requirements of different parking space scenes.

As shown in FIG. 20 to FIG. 26, in the multi-directional camera provided according to some embodiments of the present disclosure, each adjacent two camera modules 130 may be connected by a switching module. Specifically, as shown in FIG. 21 to FIG. 24, the switching module may include a two-part structure of the adapter plate 230 and the switching shaft 330. The adapter plate 230 is provided with an opening 2130. The switching shaft 330 includes a shaft component 3130 and a disc component 3230 connected to the first end of the shaft component 3130. The shaft component 3130 is arranged through the opening 2130 of the adapter plate 230, and the diameter of the disc component 3230 is larger than the diameter of the opening 2130 of the adapter plate 230, so that the disc component 3230 of the adapter plate 230 can be limited below the switching shaft 330. Further, the switching shaft 330 and the adapter plate 230 are relatively rotatable about the shaft axis o1 of the shaft component 3130. Specifically, the shaft axis o1 of the shaft component 3130 coincides with the shaft axis o of the housing 1130 of the camera module 130. Further, by connecting the adjacent two camera modules 130 to the adapter plate 230 and the switching shaft 330, respectively, the rotational connection between the adjacent two camera modules 130 can be achieved.

As shown in FIG. 21 to FIG. 24, in order to prevent the adapter plate 230 and the switching shaft 330 from being separated from each other during assembly of the camera module 130, a buckle structure may be further arranged between the adapter plate 230 and the switching shaft 330 so as to relatively fix the plate 230 and the switching shaft 330. In some embodiments, the adapter plate 230 is provided with a hook 2230 on the side facing the disc component 3230. Correspondingly, the side of the disc component 3230 facing away from the adapter plate 230 is provided with a grooved portion to be engaged with the hook 2230.

As shown in FIG. 21 to FIG. 24, the grooved portion provided on the disc component 3230 may be a ring groove 321 arranged along the peripheral of the disc component 3230. Further, the adapter plate 230 is provided with a plurality of hooks 2230. In some embodiments, the plurality of hooks 2230 are elastic hooks. The plurality of hooks 2230 may be evenly or unevenly distributed along the peripheral of the disc component 3230, and each of the plurality of hooks 2230 may buckle the ring groove 321 of the disc component 3230. The buckle connection between the hooks 2230 and the ring groove 321 do not affect the relative rotational movement between the adapter plate 230 and the switching shaft 330.

As shown in FIG. 4, by the above embodiments, in some embodiments, the disc component 3230 and the adapter plate 230 may also be provided with a damping strip 430. In some embodiments, the damping strip 430 is a silicone damping strip.

The damping strip 430 can increase the sliding friction between the disc component 3230 and the adapter plate 230 so that relative rotation of the adjacent two camera modules under non-human intervention can be avoided.

Figure 21:
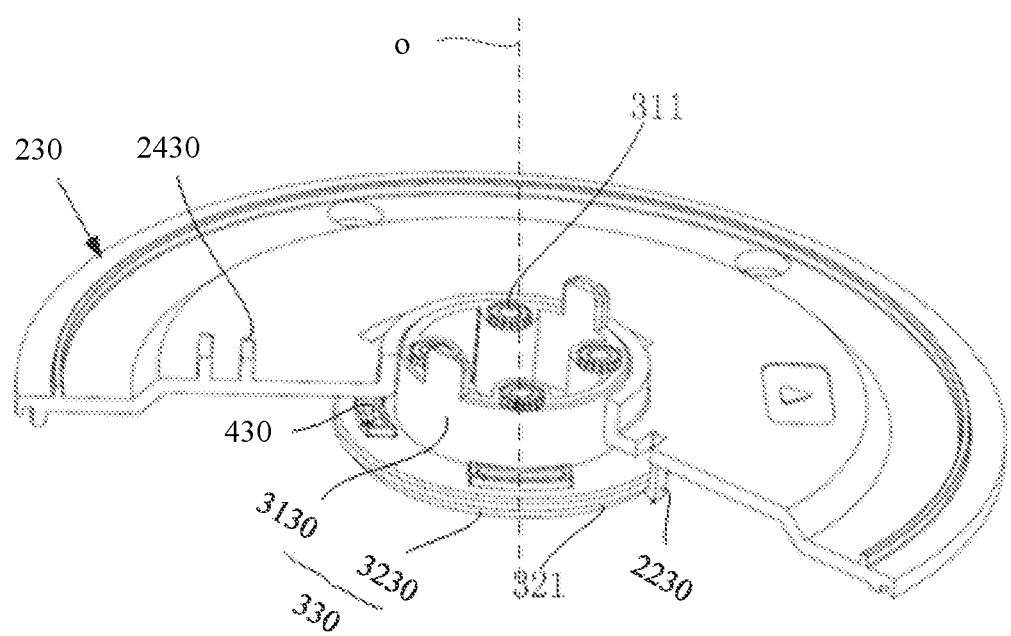
FIG. 21 is a structure diagram illustrating a switching module of a multi-directional camera according to some embodiments of the present disclosure.
Figure 24:
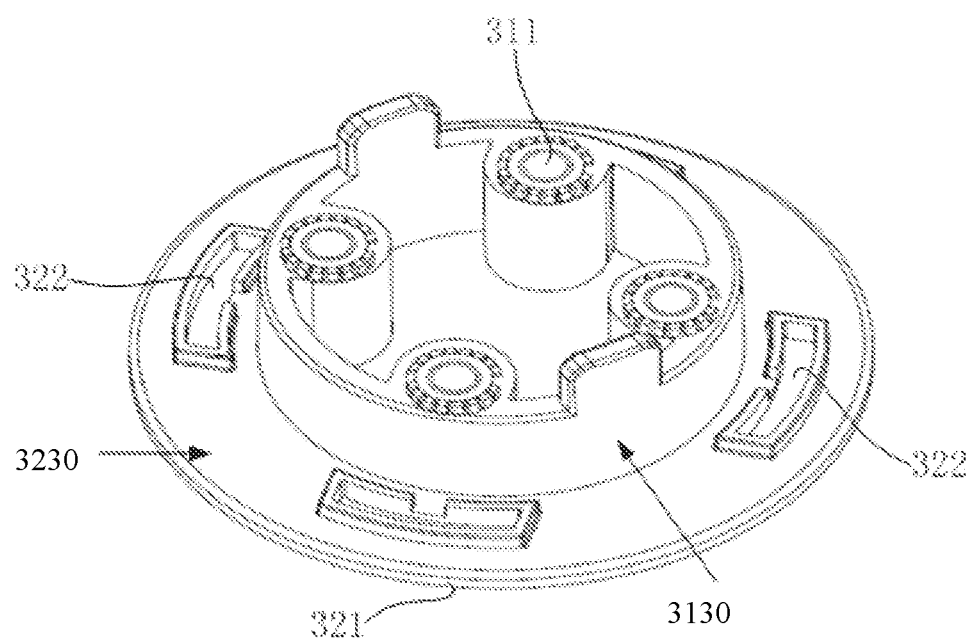
FIG. 24 is a structure diagram illustrating a switching shaft of a multi-directional camera according to some embodiments of the present disclosure.
Figure 25:
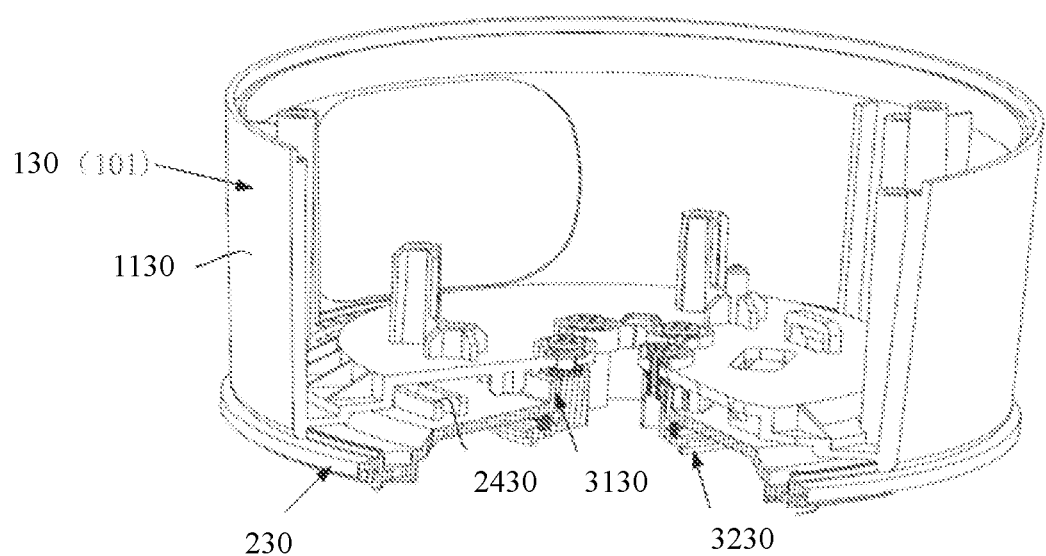
FIG. 25 is a structure diagram illustrating a connection of a first camera module and a switching module in a multi-directional camera according to some embodiments of the present disclosure.
Figure 26:
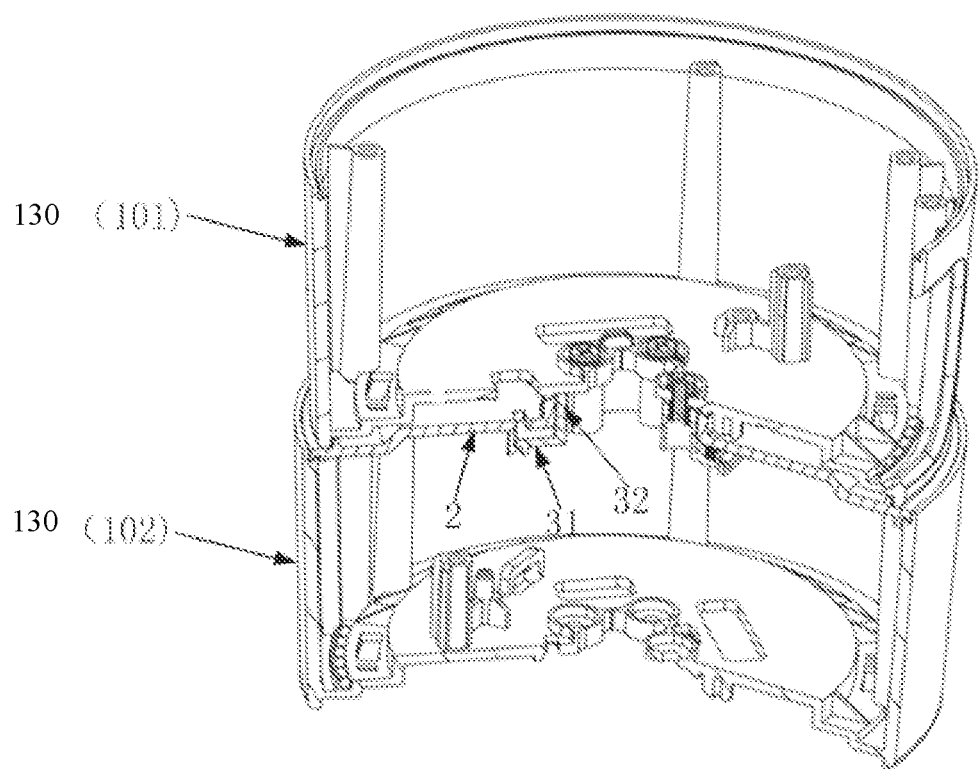
FIG. 26 is a structure diagram illustrating a first camera module and a second camera module connected by a switching module in a multi-aspect camera according to some embodiments of the present disclosure.

As shown in FIG. 21 and FIG. 24, the side of the disc component 3230 facing the adapter plate 230 is provided with a plurality of strip-shaped mounting grooves 322 surrounding the shaft component 3130, and the damping strip 430 is mounted inside one of the mounting grooves 322.

In some embodiments, in any two adjacent camera modules, the camera module near the top side of the at least two camera modules (e.g., the top of the first camera module) is a first camera module, and the camera near the bottom end side of the at least two camera modules (i.e. the bottom of the last camera module) is a second camera module. The housing of the first camera module is fixedly connected to the shaft component of the switching shaft. The housing of the second camera module is fixedly connected to the adapter plate. Taking the multi-aspect camera provided according to some embodiments of the present disclosure including two camera modules as an example, as shown in FIG. 19 to FIG. 20, FIG. 25 to FIG. 26, the first camera module 101 is located at the upper portion, and the housing 1130 is connected to the shaft component 2130 of the switching shaft 330. Correspondingly, the second camera module 102 is located at the lower portion and the housing 1130 is fixedly connected to the adapter plate 230.

Furthermore, when the multi-aspect camera provided according to some embodiments of the present disclosure includes a plurality of camera modules, it functions as a first camera module when each camera module is connected correspondingly to a camera module adjacent to its bottom. It functions as a second camera module when the camera module is connected correspondingly to a camera module adjacent to the top thereof. Therefore, the settings of the top and bottom structures of all camera modules need to be consistent. Therefore, preferably, the housing structure of each camera module can be set to be identical, i.e. the camera module can be designed as a universal module.

Figure 27:
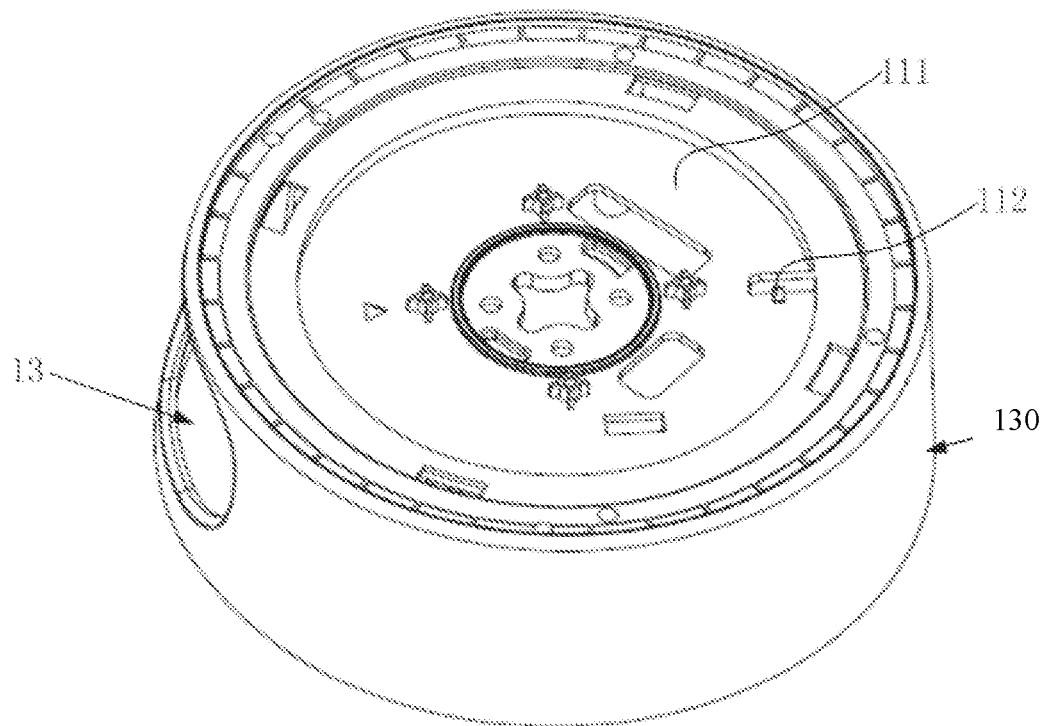
FIG. 27 is a structure diagram illustrating a camera module in a multi-directional camera according to some embodiments of the present disclosure.
Figure 28:
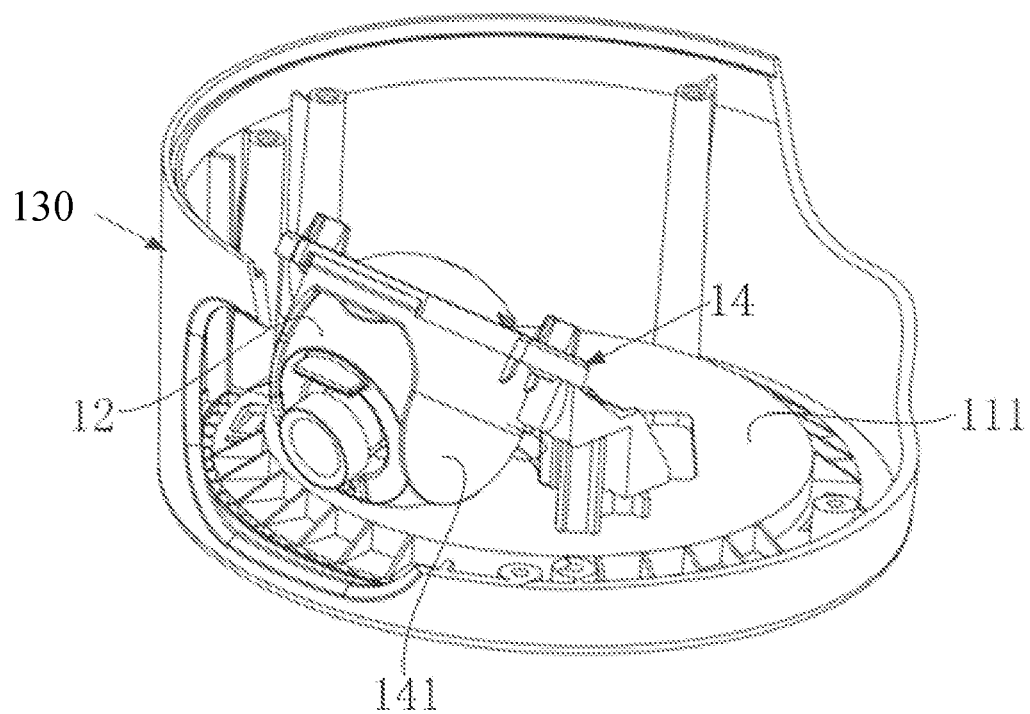
FIG. 28 is a structure diagram illustrating a camera module in a multi-directional camera according to some embodiments of the present disclosure.

In some embodiments, as shown in FIG. 27 and FIG. 28, the housing 1130 of the camera module 130 may only include a cylinder wall and a bottom wall 111, and the camera lens assembly 12 is fixed on the bottom wall 111 of the housing 1130.

Figure 19:
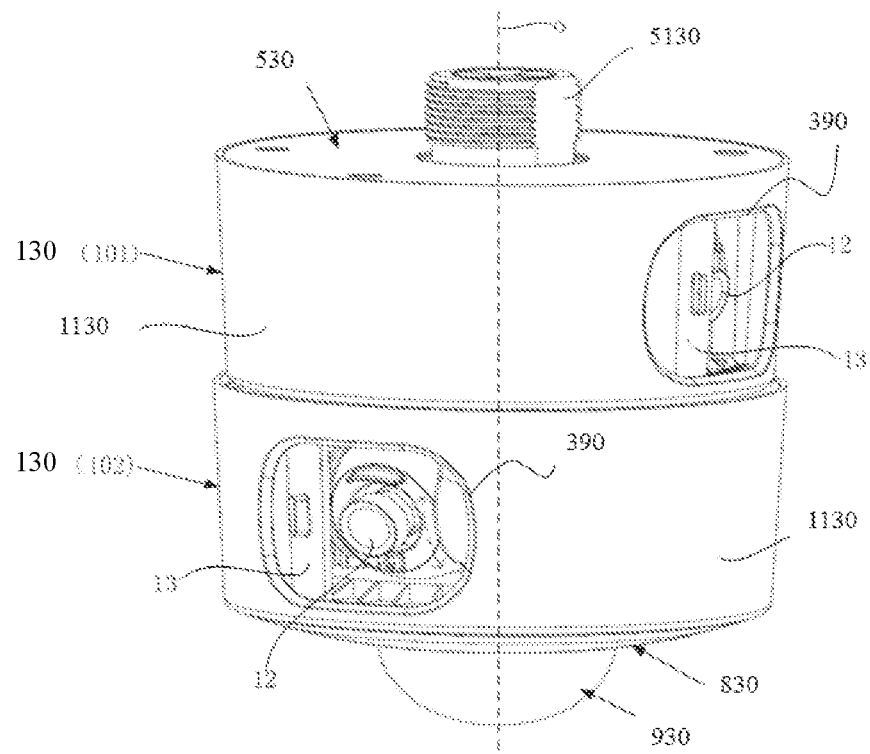
FIG. 19 is a structure diagram illustrating a multi-directional camera according to some embodiments of the present disclosure.
Figure 20:
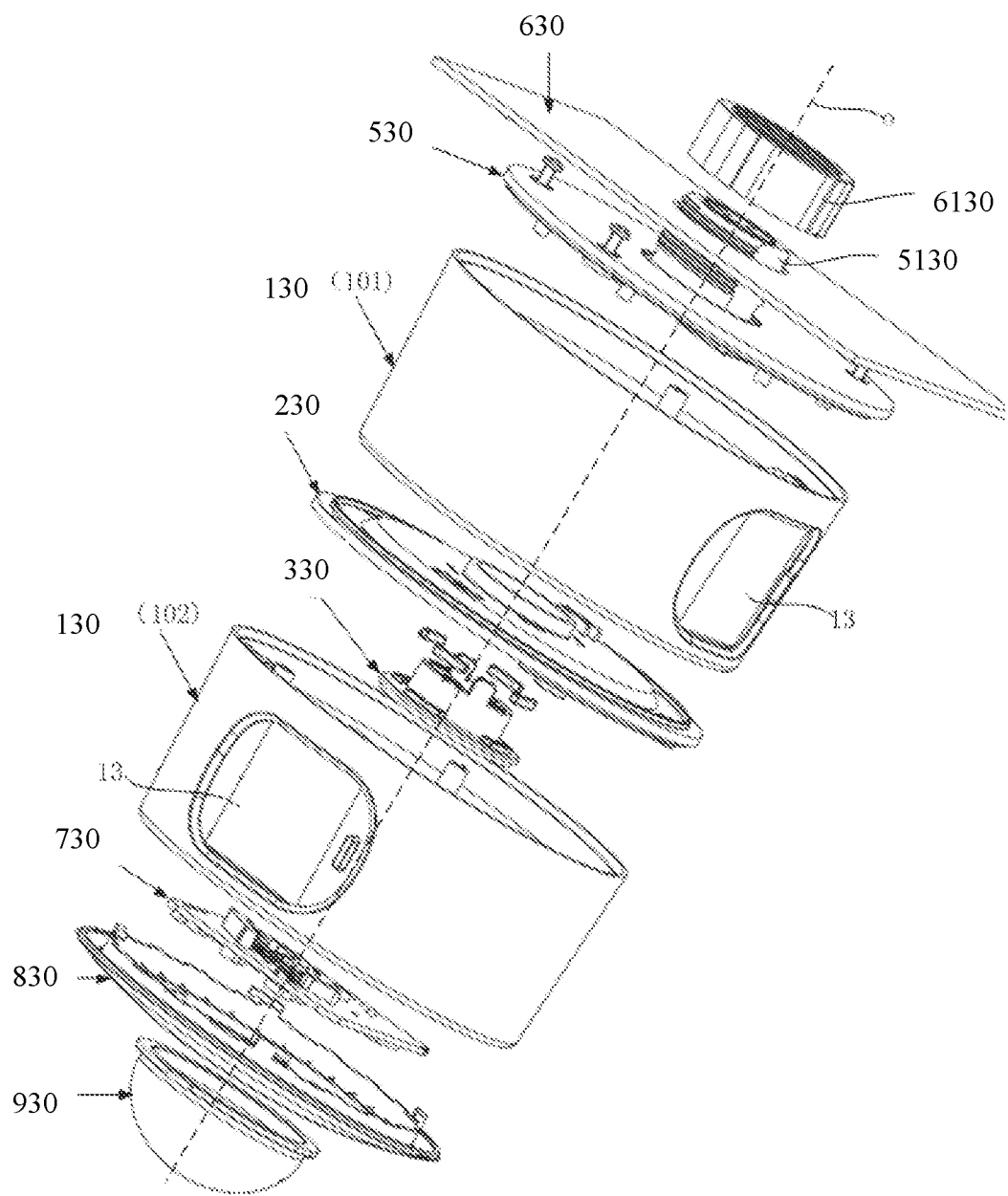
FIG. 20 is a structure diagram illustrating a multi-directional camera according to some embodiments of the present disclosure.

Further, as shown in FIG. 19 and FIG. 20, a camera cover 530 is provided with a fixing portion 5130 for fixing the entire multi-directional camera to other structures, such as the mounting plate 630. Specifically, the fixing portion 5130 is provided with an external thread, and the fixing portion 5130 passes through the mounting hole of the mounting plate 630 when installed. After the multi-directional camera is adjusted to an appropriate angle, the fixing portion 5130 and the mounting plate 630 are locked by the fixing nut 6130.

As shown in FIG. 21 and FIG. 24 to FIG. 26, the mounting hole 311 may be mounted on the second end of the shaft component 3130 of the switching shaft 330 in the switching module. Therefore, the housing 1130 of the first camera module 101 and the shaft component 3130 of the switching shaft 330 can be fixedly connected by an engaging mechanism inserted into the mounting hole 311. Specifically, the engaging mechanism may be a bolt.

Figure 22:
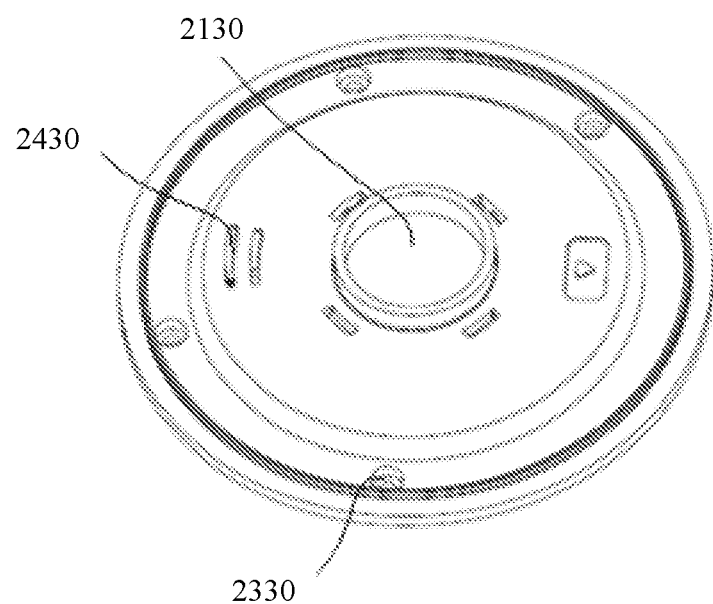
FIG. 22 is a structure diagram illustrating a front side of an adapter plate of a multi-directional camera according to some embodiments of the present disclosure.
Figure 23:
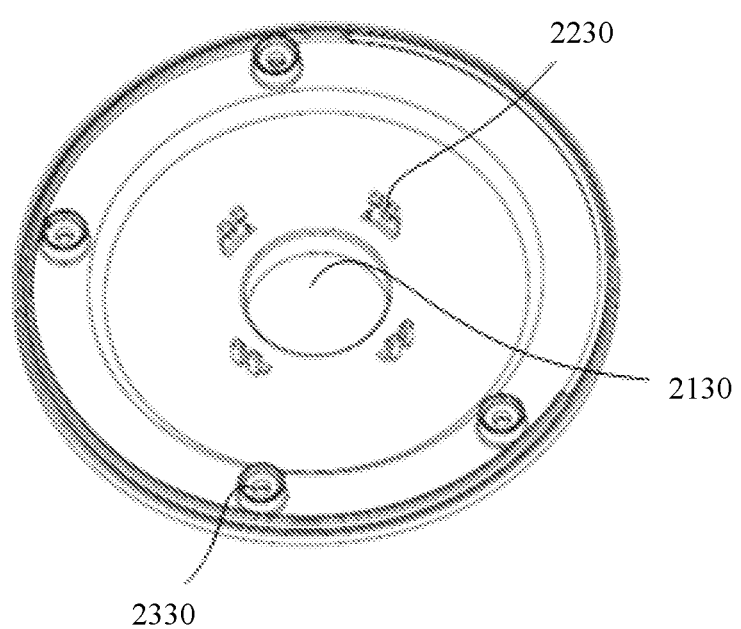
FIG. 23 is a structure diagram illustrating side of an adapter plate of a multi-directional camera according to some embodiments of the present disclosure.

As shown in FIG. 22 to FIG. 23, the adapter plate 230 may be provided with a through hole 2330. The housing 1130 of the second camera module 102 and the adapter plate 230 can be fixedly connected by an engaging mechanism inserted into the through hole 2330. Specifically, the engaging mechanism may be a bolt.

As shown in FIG. 21, FIG. 22, FIG. 25 and FIG. 27, a position-limiting mechanism 2430 is arranged on the side of the adapter plate 230 facing the first camera module 101. The housing 1130 of the first camera module 101 facing the adapter plate 230 (i.e., the outer side of the bottom wall 111 of the camera module 13) is provided with a stopper 112 corresponding to the limiting structure 2430. When the first camera module 101 and the adapter plate 230 are rotated to a particular position, the limiting structure 2430 and the stopper 112 can lock each other from movement when they come into contact. That is, when the first camera module 101 and the second camera module 102 are rotated to a particular position, the limiting structure 2430 and the stopper 112 may contact each other. Thereby, the first camera module 101 and the second camera module 102 can be stopped from rotating with respect to each other. Further, it is possible to prevent the relative rotation angles of the adjacent two camera modules 130 from being excessively large, so that the internal cables connected to the two camera modules 130 can be prevented from being entangled.

As shown in FIG. 19 and FIG. 20, the multi-directional camera may further include an indicator board 730 mounted on a bottom wall of at least two camera modules 130. The indicator board 730 is provided with indicator. An indicator board supporting structure such as an indicator board frame 830 may be arranged on the side of the indicator board 730 away from the at least two camera modules 130, and a transparent indicator cover 930 may be mounted on the indicator board frame 830. Further, the multi-directional camera may also have an instructing function and can realize a parking space guiding function when used for parking space detection.

As shown in FIG. 19 and FIG. 20, the indicator board frame 830 is mounted on the housing 1130 of the bottommost camera module 130, and the indicator board frame 830 is connected to the housing 1130 of the bottommost camera module 130 through a buckle.

Further, the transparent indicator cover 930 and the indicator board frame 830 may also be connected by a buckle.

As shown in FIG. 19, FIG. 20 and FIG. 27, in each camera module 130, a lens window 13 that can open and close the opening mounted on the wall of the housing 1130 is provided. The lens window 13 is made of a transparent material.

The angle of the camera lens assembly 12 located in the housing 1130 can be adjusted through the opening on the housing 1130. If the angle adjustment of the camera lens assembly 12 is not needed, the opening can be closed by the lens window 13 to protect the camera lens assembly 12. Since the lens window 13 is transparent, it can allow light to pas without affecting the working of the camera lens assembly 12.

As shown in FIG. 19, FIG. 20 and FIG. 27, the lens window 13 can slide along the wall of the housing 1130 to open or close the opening. The cylinder wall of the housing is provided with a sliding rail extending along a circumferential direction thereof. The lens window 13 is slidably mounted on the housing 1130 along the slide rails. Further, when the lens window 13 is slid to the opening, the opening can be closed, and when the lens window is slided to the opening, the opening can be opened.

As shown in FIG. 19, FIG. 20 and FIG. 27, a buckle structure may also be provided between the lens window 13 and the slide rail for allowing the lens window 13 to remain stable in the close status.

As shown in FIG. 28, the camera module 130 may further include a fixing frame 14 of the camera lens assembly 12. The fixing frame 14 of the camera lens assembly 14 is fixedly mounted on the bottom wall 111 of the housing 130 of the camera module 130. The camera lens assembly 12 is mounted on the fixing frame 14 of the camera lens assembly 12.

As shown in FIG. 28, the camera lens assembly 12 is spherical. The fixing frame 14 of the camera lens assembly 12 is provided with a spherical cavity 141 matched with the camera lens assembly 12. The camera lens assembly 12 is mounted within the spherical cavity 141 and is rollable with respect to the spherical cavity 141.

Further, a damping structure may be provided on the inner side of the spherical cavity 141. For example, the damping foam may be attached to the inner side of the spherical cavity 141 to increase the friction between the spherical cavity 141 and the camera lens assembly 12 to prevent the camera lens assembly 12 from rotating under non-human intervention. For example, it is possible to prevent the camera lens assembly 12 from rotating when the parking space detector is subjected to an accidental vibration to cause an angle change.

It should be noted that the multi-directional camera provided according to some embodiments of the present disclosure may include two camera modules, and may also include multiple camera modules. Moreover, the multi-directional camera may adjust the monitoring direction of the lens according to specific scenarios. The adjustment range is vast, and the adjustment process can be realized without any tools. The multi-directional camera has a wide range of use, and is particularly suitable as a parking space detector for monitoring a scene with a double-side parking space or a plurality of parking spaces.

It should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A device, comprising:
   a first camera which is rotatable around a first axis, wherein the first camera has a first camera housing and a first lens assembly arranged in the first camera housing; and
   a second camera which is rotatable around a second axis, wherein the second camera has a second camera housing and a second lens assembly arranged in the second camera housing, and at least one of the first camera housing or the second camera housing includes a window;
   wherein the first axis is in a direction of the second axis.

2. The device of claim 1, wherein the first axis is parallel to the second axis.

3. The device of claim 1, wherein the first axis is the same as the second axis.

4. The device of claim 1, further comprising:
   an indicator board mounted on a bottom wall of the device,
   an indicator board frame arranged on a side of the indicator board away from the device, and
   a transparent indicator cover mounted on the indicator board frame.

5. The device of claim 4, wherein the transparent indicator cover and the indicator board frame are connected by a buckle.

6. The device of claim 3, wherein the first camera and the second camera are respectively rotatable around the first axis.

7. The device of claim 6, wherein
   at least one opening is mounted on a wall of at least one of the first camera housing or the second camera housing,
   at least one slide rail is mounted on the wall of at least one of the first camera housing or the second camera housing,
   wherein the window on the first camera housing or the second camera housing slidably moves along the at least one slide rail to open or close the at least one opening.

8. The device of claim 6, wherein at least one of the first camera or the second camera includes a fixing frame, and the fixing frame is fixedly mounted on a bottom wall of at least one of the first camera housing or the second camera housing.

9. The device of claim 6, wherein the first camera and the second camera are interconnected through a connecting module comprising:
   a switching board with an opening thereon; and
   a switching shaft comprising a shaft component and a disc component connected to the shaft component,
   wherein the shaft component goes through the opening, and the shaft component is rotatable with respect to the switching board around an axis of the shaft component.

10. The device of claim 9, wherein the first camera is fixedly connected with the shaft component of the switching shaft, and the second camera is fixedly connected with the switching board.

11. The device of claim 9, wherein the switching board is provided with at least one hook on a side facing the disc component, and a side of the disc component facing away from the switching board is provided with a grooved portion to be engaged with the at least one hook.

12. The device of claim 11, wherein the grooved portion provided on the disc component is a ring groove arranged along a peripheral of the disc component, and the at least one hook is evenly distributed along the peripheral of the disc component.

13. The device of claim 9, wherein the disc component and the switching board are provided with a damping strip.

14. The device of claim 13, wherein a side of the disc component facing the switching board is provided with a plurality of strip-shaped mounting grooves surrounding the shaft component, and the damping strip is mounted inside one of the mounting grooves.

15. The device of claim 9, wherein a mounting hole is mounted on one end of the shaft component, and the first camera housing and the shaft component of the switching shaft are fixedly connected by an engaging mechanism inserted into the mounting hole.

16. The device of claim 9, wherein a through hole is set on the switching board, and the second camera housing and the switching board are fixedly connected by an engaging mechanism inserted into the through hole.

17. The device of claim 9, wherein a position-limiting structure is arranged on a side of the switching board facing the first camera, and the first camera facing the switching board is provided with a stopper corresponding to the position-limiting structure.

18. The device of claim 17, wherein when the first camera and the switching board are rotated to a particular position, the position-limiting structure and the stopper lock each other from movement when they come into contact.

* * * * *